United States Patent
Matsutani

(10) Patent No.: US 9,614,984 B2
(45) Date of Patent: Apr. 4, 2017

(54) ELECTRONIC DOCUMENT GENERATION SYSTEM AND RECORDING MEDIUM

(71) Applicant: KONICA MINOLTA, INC., Chyoda-ku, Tokyo (JP)

(72) Inventor: Noritsugu Matsutani, Nagoya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/674,848

(22) Filed: Mar. 31, 2015

(65) Prior Publication Data

US 2015/0304510 A1 Oct. 22, 2015

(30) Foreign Application Priority Data

Apr. 16, 2014 (JP) ................................ 2014-084743

(51) Int. Cl.
*G06F 3/12* (2006.01)
*G06K 15/00* (2006.01)
(Continued)

(52) U.S. Cl.
CPC ..... *H04N 1/00241* (2013.01); *G06K 9/00442* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS 5,191,612 A * 3/1993 Katsuyama ............ G06K 9/346
358/462
5,224,038 A * 6/1993 Bespalko ............ G06F 17/2205
715/234
(Continued)

FOREIGN PATENT DOCUMENTS

JP 2007-181077 A 7/2007
JP 2009-48293 A 3/2009
(Continued)

OTHER PUBLICATIONS

Office Action (Notification of Reasons for Refusal) dated Jun. 8, 2016 issued by the Japanese Patent Office in corresponding Japanese Patent Application No. 2014-084743, and English language translation of Office Action (15 pages).

*Primary Examiner* — Madelein Nguyen
(74) *Attorney, Agent, or Firm* — Buchanan Ingersoll & Rooney PC

(57) ABSTRACT

An electronic document generation system includes an image forming apparatus that generates a scanned image of an original document, and an external terminal that generates an electronic document based on image data regarding the scanned image received from the image forming apparatus. The image forming apparatus includes an auxiliary data generation unit that generates auxiliary data to be used in processing for generating the electronic document, and a communication unit that transmits the auxiliary data to the external terminal. The external terminal includes a document generation unit that uses the auxiliary data received from the image forming apparatus to generate the electronic document based on the image data regarding the scanned image in cooperation with an external cooperative device different from the external terminal. The document generation unit generates the electronic document by complement- (Continued)

ing the result of processing performed on the image data with the auxiliary data.

22 Claims, 23 Drawing Sheets

(51) Int. Cl.
*H04N 1/00* (2006.01)
*G06K 9/00* (2006.01)

(56) References Cited

U.S. PATENT DOCUMENTS

| | | | | |
|---|---|---|---|---|
| 6,375,306 | B1* | 4/2002 | Tsukagoshi | B41J 11/008 347/12 |
| 7,495,795 | B2* | 2/2009 | Graham | G06F 17/30017 358/1.15 |
| 7,812,986 | B2* | 10/2010 | Graham | G06K 9/325 358/1.15 |
| 7,876,470 | B2* | 1/2011 | Watanabe | G06K 15/02 358/1.1 |
| 9,304,726 | B2* | 4/2016 | Sasase | G06F 3/1255 |
| 2002/0135800 | A1* | 9/2002 | Dutta | G06F 3/1219 358/1.15 |
| 2003/0035063 | A1* | 2/2003 | Orr | H04N 7/0885 348/465 |
| 2004/0049735 | A1* | 3/2004 | Tsykora | G06F 17/211 715/234 |
| 2004/0130748 | A1* | 7/2004 | Hashimoto | G06F 3/121 358/1.15 |
| 2006/0290952 | A1* | 12/2006 | Owen | G06F 3/1204 358/1.8 |
| 2007/0041041 | A1* | 2/2007 | Engbrocks | G06F 3/1208 358/1.15 |
| 2007/0046983 | A1* | 3/2007 | Hull | G06K 9/00442 358/1.15 |
| 2007/0047002 | A1* | 3/2007 | Hull | G06F 17/30047 358/3.28 |
| 2007/0047816 | A1* | 3/2007 | Graham | G06K 9/00442 382/181 |
| 2007/0047818 | A1* | 3/2007 | Hull | G06K 9/00442 382/190 |
| 2007/0052997 | A1* | 3/2007 | Hull | G06K 9/00463 358/1.15 |
| 2007/0146798 | A1 | 6/2007 | Eto et al. | |
| 2007/0226321 | A1* | 9/2007 | Bengtson | H04N 1/00244 709/219 |
| 2009/0313245 | A1* | 12/2009 | Weyl | G06F 17/30253 |
| 2010/0007912 | A1* | 1/2010 | Saito | G06F 21/608 358/1.15 |
| 2010/0182631 | A1* | 7/2010 | King | G06F 17/243 358/1.15 |
| 2010/0245870 | A1 | 9/2010 | Shibata | |
| 2011/0035656 | A1* | 2/2011 | King | G06F 17/211 715/234 |
| 2011/0243444 | A1* | 10/2011 | Mitic | G06K 9/342 382/176 |
| 2012/0140251 | A1* | 6/2012 | Grodsky | G06F 3/1206 358/1.9 |
| 2012/0262749 | A1* | 10/2012 | Yamamoto | H04N 1/00244 358/1.14 |
| 2013/0003088 | A1* | 1/2013 | Feng | G06F 3/1204 358/1.9 |
| 2013/0027743 | A1* | 1/2013 | Enami | G06F 3/1204 358/1.15 |
| 2013/0083337 | A1* | 4/2013 | Tecu | G06F 3/1204 358/1.13 |
| 2013/0111009 | A1* | 5/2013 | Sng | H04L 67/2809 709/224 |
| 2014/0002857 | A1* | 1/2014 | Huang | H04N 1/00222 358/1.15 |
| 2014/0168666 | A1* | 6/2014 | Sakurai | G06F 3/1208 358/1.2 |
| 2014/0214957 | A1* | 7/2014 | Taniguchi | H04L 67/306 709/204 |
| 2014/0240763 | A1* | 8/2014 | Urakawa | G06F 3/1292 358/1.15 |
| 2014/0240774 | A1* | 8/2014 | Suzuki | G06F 3/1236 358/1.15 |
| 2014/0240775 | A1* | 8/2014 | Suzuki | G06F 3/1292 358/1.15 |
| 2014/0313539 | A1* | 10/2014 | Kawano | G06F 21/44 358/1.14 |
| 2014/0355037 | A1* | 12/2014 | Yoneda | H04N 1/4406 358/1.14 |
| 2014/0365655 | A1* | 12/2014 | Takahashi | H04L 67/10 709/225 |
| 2014/0372514 | A1* | 12/2014 | Doui | G06F 3/1222 709/203 |
| 2015/0036175 | A1* | 2/2015 | Yun | G06F 3/1212 358/1.15 |
| 2015/0077790 | A1* | 3/2015 | Nagasawa | G06F 3/1285 358/1.15 |
| 2015/0092233 | A1* | 4/2015 | Park | G06F 3/1288 358/1.15 |
| 2015/0169743 | A1* | 6/2015 | Moriwaki | G06Q 30/0269 707/739 |
| 2015/0205552 | A1* | 7/2015 | Sasase | G06F 3/1255 358/1.15 |
| 2015/0317531 | A1* | 11/2015 | Kawano | G06K 9/36 382/176 |
| 2016/0014293 | A1* | 1/2016 | Iwai | H04N 1/00949 358/1.15 |
| 2016/0080605 | A1* | 3/2016 | Kuwano | H04N 1/3876 358/1.18 |

FOREIGN PATENT DOCUMENTS

| | | |
|---|---|---|
| JP | 2010-231648 A | 10/2010 |
| JP | 2012-022571 A | 2/2012 |
| JP | 2012-073749 A | 4/2012 |
| JP | 2013-236234 A | 11/2013 |

\* cited by examiner

ELECTRONIC DOCUMENT GENERATION SYSTEM AND RECORDING MEDIUM

This application is based on Japanese Patent Application No. 2014-084743 filed on Apr. 16, 2014, the contents of which are hereby incorporated by reference.

BACKGROUND OF INVENTION

Technical Field

The present invention relates to an electronic document generation system for generating an electronic document, and technology related thereto.

Background Art

Techniques are known for scanning an original document and generating an electronic document with an image forming apparatus such as a Multi-Functional Peripheral (MFP).

Examples of the techniques include a technique for generating an electronic document with text data, which will be described below, (see JP 2012-73749A, for example) in addition to a technique for directly obtaining a scanned image of an original document and generating an electronic document. More specifically, a scanned image of an original document (in particular, an image representing characters) is subjected to optical character recognition processing (hereinafter also referred to as "OCR processing") in which text data of characters in the scanned image is automatically recognized and overlaid with and embedded in the scanned image without being displayed. This produces an electronic document in a predetermined format (electronic document with text data) known as a PDS (a portable document format) document with invisible text (or searchable PDF document).

Incidentally, it is conceivable for an external terminal that coordinates with an image forming apparatus to generate an electronic document based on a scanned image generated by the image forming apparatus. It is also conceivable for the external terminal to generate such an electronic document in cooperation with yet another external device (e.g., a cloud server). To be more specific, a case is conceivable in which the external terminal transmits a scanned image to the cloud server, requests the cloud server to perform OCR processing on the scanned image, and receives the result of such processing from the cloud server.

However, a case is imaginable in which the OCR processing service given by the cloud server provides only fundamental functions (general-purpose OCR processing). The general-purpose OCR processing service returns only text data to a client device as a result of the OCR processing. This requires the client device to perform final processing for generating an electronic document with text data.

In this case, for example, part of the information included in the scanned image (information such as the position of the end of each line in each sentence included in the scanned image targeted for OCR processing, or the font size for each sentence) may not be included in return data from the cloud server. This can cause a problem such that, when the external terminal arranges character strings of the OCR processing result in an electronic document, characters in lines next and subsequent to a character at the end of a certain line in a character string that spans a plurality of lines are arranged at different positions other than their original positions. That is, a case is conceivable in which such missing information or the like prevents the external terminal from always generating a satisfactory electronic document. In other words, it is difficult to minutely construct an electronic document based on a scanned image received from the image forming apparatus by using only the scanned image and the result of general-purpose OCR processing received from the cloud server.

SUMMARY OF INVENTION

One of objects of the present invention is to provide a technique that enables an external terminal to generate an excellent electronic document based on a scanned image received from an image forming apparatus in cooperation with another external cooperative device.

One aspect of the present invention is an electronic document generation system that includes an image forming apparatus configured to generate a scanned image of an original document, and an external terminal configured to generate an electronic document on the basis of image data regarding the scanned image received from the image forming apparatus. The image forming apparatus includes an auxiliary data generation unit configured to generate auxiliary data that is used in processing for generating the electronic document, and a communication unit configured to transmit the auxiliary data to the external terminal. The external terminal includes a reception unit configured to receive the auxiliary data from the image forming apparatus, and a document generation unit configured to use the auxiliary data to generate the electronic document on the basis of the image data regarding the scanned image in cooperation with an external cooperative device that is a different device from the external terminal. The document generation unit is configured to complement a result of processing performed on the image data with the auxiliary data to generate the electronic document.

Another aspect of the present invention is a non-transitory computer-readable recording medium that records a program for causing a computer that is built into an external terminal and configured to generate an electronic document on the basis of image data regarding a scanned image received from an image forming apparatus, to execute the steps of a) receiving auxiliary data to be used in processing for generating the electronic document, from the image forming apparatus, and b) using the auxiliary data to generate the electronic document on the basis of the image data regarding the scanned image in cooperation with an external cooperative device that is a different device from the external terminal. In the step b), a result of processing performed on the image data is complemented with the auxiliary data to generate the electronic document.

These and other objects, features, aspects and advantages of the present invention will become more apparent from the following detailed description of the present invention when taken in conjunction with the accompanying drawings.

DETAILED DESCRIPTION OF PREFERRED EMBODIMENTS

Hereinbelow, embodiments of the present invention will be described with reference to the accompanying drawings.

1. First Embodiment

1-1. Overview of Configuration

Figure 1:
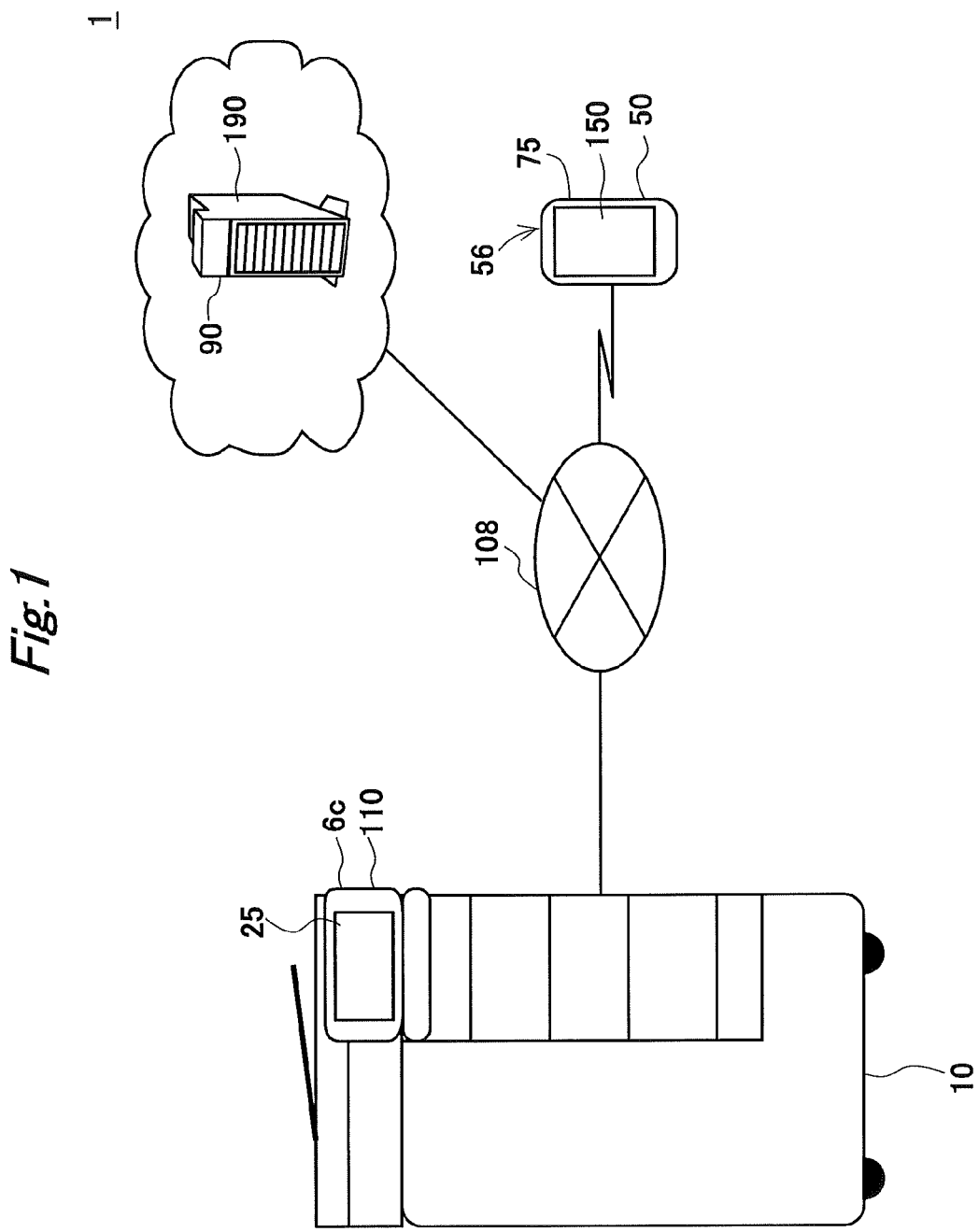
FIG. 1 illustrates an image forming system.

FIG. 1 illustrates an image forming system 1 according to the present invention. As illustrated in FIG. 1, the image forming system 1 includes an image forming apparatus 10, an external terminal 50, and a cloud server 90.

The image forming apparatus 10, the external terminal 50, and the cloud server 90 are connected to one another via a network (communication network) 108. The network 108 is, for example, a local area network (LAN) or the Internet. The connection to the network 108 may be either wired or wireless connection. For example, the image forming apparatus 10 and the cloud server 90 are wire-connected to the network 108, and the external terminal 50 is wirelessly connected to the network 108.

The cloud server 90 is an external device (external server) that is different from the image forming apparatus 10 and the external terminal 50. The cloud server 90 has an application 190 (here, a general-purpose optical character recognition (OCR) application) installed therein. The cloud server 90 provides a general-purpose OCR processing service, using the application (also referred to as the "general-purpose OCR application") 190. This cloud server 90 (application 190) does not provide a service of processing for generating a searchable PDF (portable document format) document. A searchable PDF document is primarily generated by the external terminal 50 coordinating with the cloud server 90, for example, as will be described later.

In the image forming system 1, the image forming apparatus 10 generates a scanned image 200 (see FIGS. 4 and 5, for example) of an original document and transmits image data regarding the scanned image 200 to the external terminal 50. The external terminal 50 generates an electronic document 500 (see FIG. 5, for example) based on, for example, the image data received from the image forming apparatus 10. The operation of generating the electronic document 500 is implemented by, for example, executing an electronic document generation application 150 that is installed in the external terminal 50.

The electronic document generation application 150 generates the electronic document 500 in cooperation with the image forming apparatus 10 and the cloud server 90 on the basis of a result of cooperative processing that is requested to the cloud server 90 and auxiliary data 300 (described later) received from the image forming apparatus 10. The electronic document 500 generated here is an electronic document with text data (here, a searchable PDF document). The cloud server 90, which is an external device coordinating with the external terminal 50 (and the image forming apparatus 10), is also referred to as an "external cooperative device."

Note that the image forming system 1 is a system for generating an electronic document and thus also referred to as an "electronic document generation system." Similarly, the external terminal 50 is also referred to as an "electronic document generation apparatus."

1-2. Configuration of Image Forming Apparatus

Figure 2:
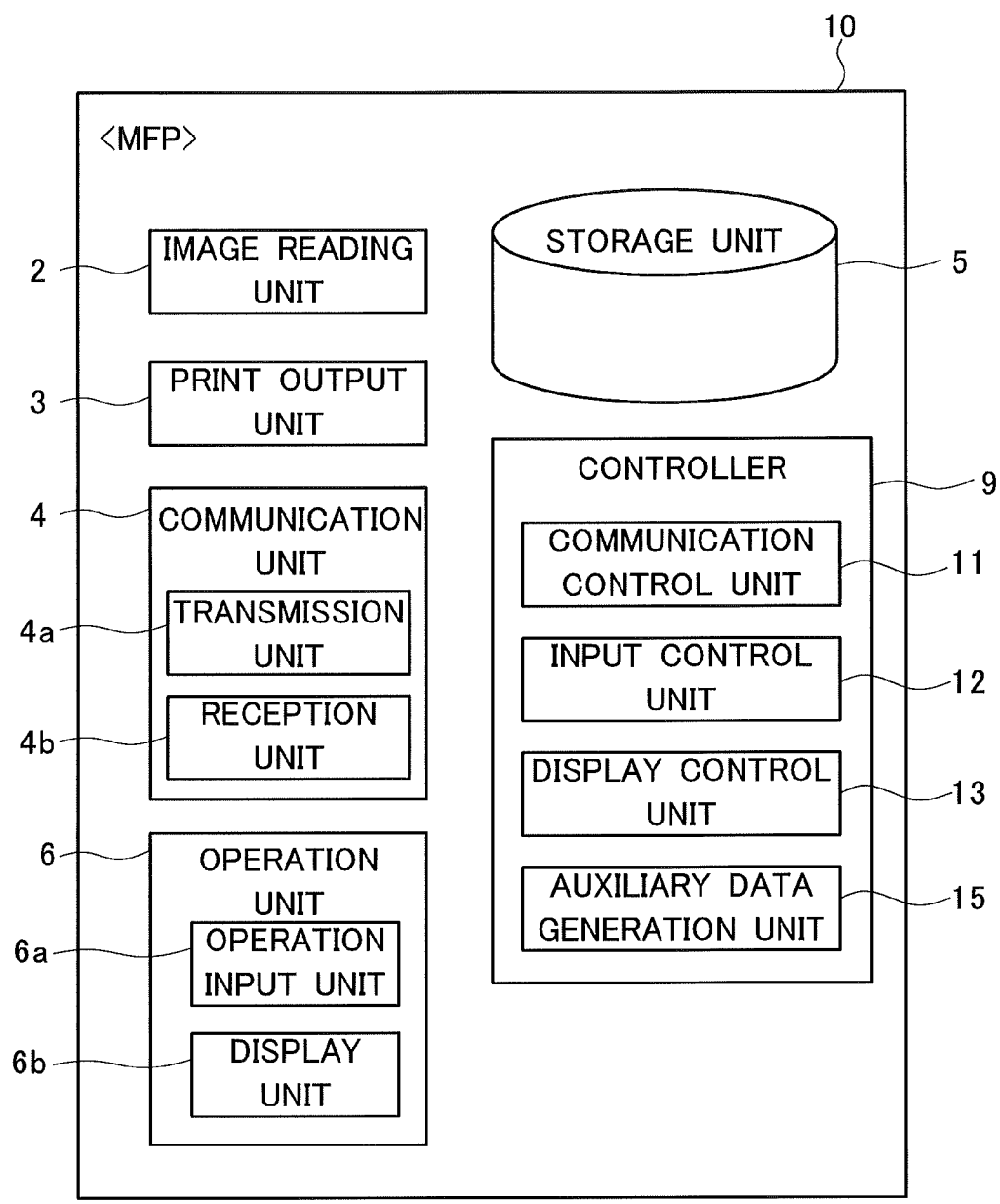
FIG. 2 is a functional block diagram of an MFP (image forming apparatus).

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a storage unit 5, an operation unit 6, and a controller 9 as illustrated in the functional block diagram of FIG. 2, and achieves various functions by operating these units in combination.

The image reading unit 2 is a processing unit configured to optically read (i.e., scan) an original document that is placed at a predetermined position on the MFP 10, and generate image data of the original document (also referred to as an "original image" or a "scanned image"). The image reading unit 2 is also referred to as a "scanning unit."

The print output unit 3 is an output unit configured to print out an image on various types of media, such as paper, on the basis of data regarding an object to be printed.

The communication unit 4 is a processing unit capable of facsimile communication via a public network, for example. The communication unit 4 is also capable of network communication via the network 108. In the network communication, various types of protocols such as TCP/IP (Transmission Control Protocol/Internet Protocol) are used. Using the network communication enables the MFP 10 to exchange various types of data with desired destinations (e.g., the external terminal 50). The communication unit 4 includes a transmission unit 4a configured to transmit various types of data and a reception unit 4b configured to receive various types of data.

The storage unit 5 is a storage device such as a hard disk drive (HDD).

The operation unit 6 includes an operation input unit 6a configured to receive input of operation to the MFP 10, and a display unit 6b configured to display and output various types of information.

The MFP 10 is also provided with a generally plate-like operation panel unit 6c (see FIG. 1). The operation panel unit 6c includes a touch panel 25 (see FIG. 1) on the front side. The touch panel 25 functions not only as part of the operation input unit 6a but also functions as part of the display unit 6b. The touch panel 25 is configured by embedding various sensors or the like in a liquid crystal display panel, and is capable of displaying various types of information as well as receiving various types of operation input from an operator.

For example, the touch panel 25 displays various types of operation screens (e.g., a menu screen), which includes images of buttons, for example. By pressing such buttons virtually arranged in the operation screen of the touch panel 25, the operator can set the details of various operations to be performed by the MFP 10 and can give operational instructions.

The controller 9 is a control device that is built into the MFP 10 and configured to perform overall control of the MFP 10. The controller 9 is configured as a computer system that includes a CPU and various types of semiconductor memories (RAM and ROM), for example. The controller 9 implements various types of processing units by causing the CPU to execute a predetermined software program (hereinafter also simply referred to as a "program") 110 (see FIGS. 1 and 4, for example) stored in a ROM (e.g., EEPROM). Note that the program (specifically, a group of program modules) 110 may be recorded in a portable recording medium (or in other words, any of various types of non-transitory computer-readable recording media) such as a USB memory, read from the recording medium, and installed into the MFP 10. Alternatively, the program 110 may be downloaded via the network 108, for example, and installed into the MFP 10.

More specifically, by executing the program 110, the controller 9 implements various types of processing units including a communication control unit 11, an input control unit 12, a display control unit 13, and an auxiliary data generation unit 15, as illustrated in FIG. 2.

The communication control unit 11 is a processing unit configured to control an operation of communication with another device (e.g., the external terminal 50) in cooperation with the communication unit 4, for example. The communication control unit 11 transmits, for example, a scanned image to the external terminal 50.

The input control unit 12 is a control unit configured to control operation input to the operation input unit 6a (e.g., the touch panel 25). For example, the input control unit 12 controls an operation of receiving operation input to the operation screen displayed on the touch panel 25.

The display control unit 13 is a processing unit configured to control a display operation of the display unit 6b (e.g., the touch panel 25). The display control unit 13 causes, for example, the touch panel 25 to display an operation screen for operating the MFP 10.

The auxiliary data generation unit 15 is a processing unit configured to generate auxiliary data (also referred to as "supplementary data" or "correction data") 300. This auxiliary data 300 is different data (secondary data) other than the image data itself of the original scanned image 201 and is used in the electronic document generation processing performed in cooperation with the cloud server 90.

1-3. Configuration of External Terminal

Next is a description of a configuration of the external terminal 50.

The external terminal 50 is an information input/output terminal device (also referred to as an "information terminal" or a "communication terminal") capable of network communication with the MFP 10 and the cloud server 90. Here, a tablet terminal is illustrated as an example of the external terminal 50. The present invention is, however, not limited to this example, and the external terminal 50 may be other devices such as a smartphone or a personal computer. The external terminal 50 may be either a portable device (e.g., a personal digital assistant or a mobile terminal) or a stationary device.

Figure 3:
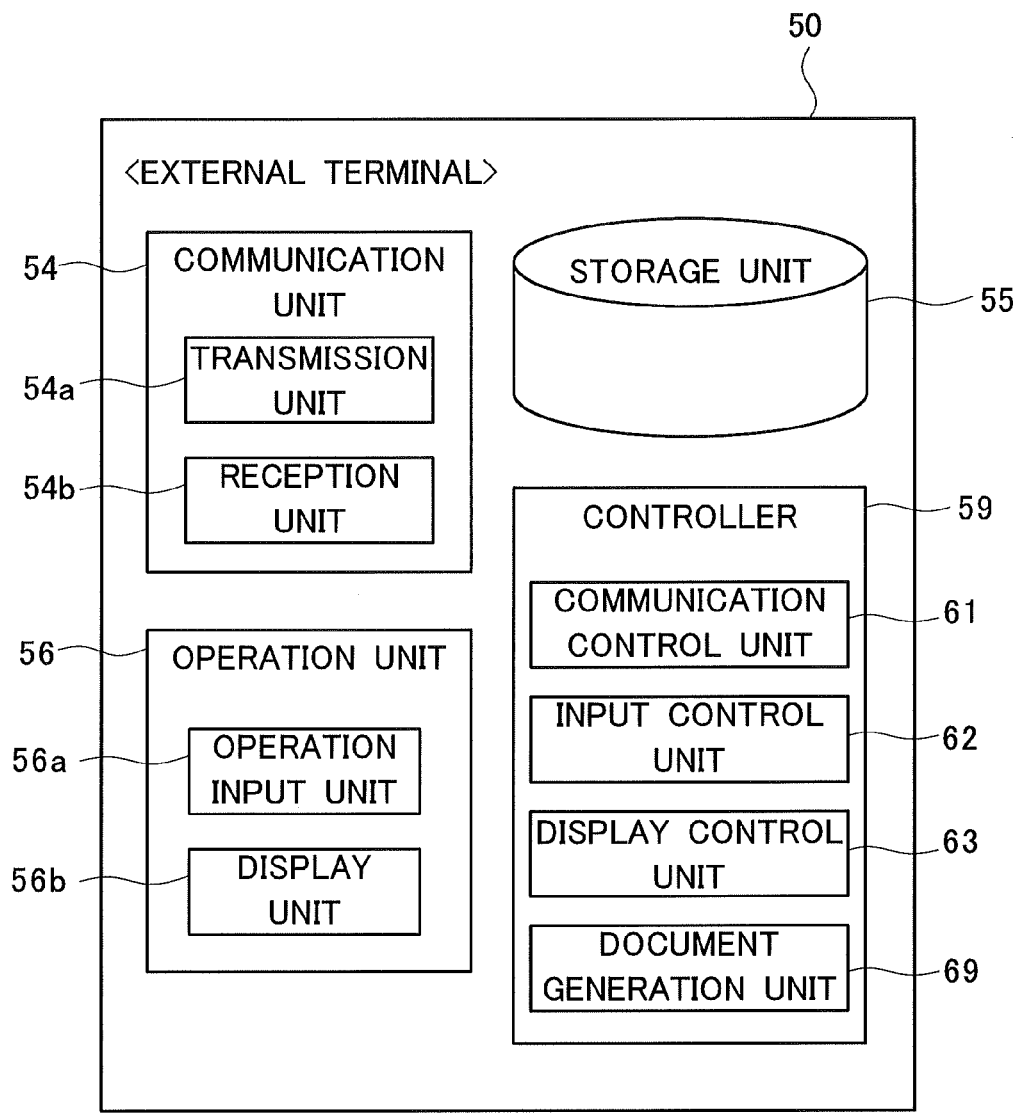
FIG. 3 is a functional block diagram illustrating a schematic configuration of an external terminal.

FIG. 3 is a functional block diagram illustrating an overall configuration of the external terminal 50.

As illustrated in the functional block diagram of FIG. 3, the external terminal 50 includes, for example, a communication unit 54, a storage unit 55, an operation unit 56, and a controller 59 and achieves various functions by operating these units in combination.

The communication unit 54 is capable of network communication via the network 108. In the network communication, various types of protocols such as TCP/IP (Transmission Control Protocol/Internet Protocol) are used. Using the network communication enables the external terminal 50 to exchange various types of data with desired destinations (e.g., the MFP 10 and the cloud server 90). The communication unit 54 includes a transmission unit 54a configured to transmit various types of data and a reception unit 54b configured to receive various types of data. For example, the reception unit 54b receives the scanned image 200 or the like from the MFP 10, and the transmission unit 54a transmits the image data regarding the scanned image 200 to the cloud server 90. The reception unit 54b also receives a result of OCR processing performed on the scanned image 200 or the like from the cloud server 90.

The storage unit 55 is a storage device such as a non-volatile semiconductor memory, and stores various types of information.

The operation unit 56 includes an operation input unit 56a configured to receive operation input to the external terminal 50, and a display unit 56b configured to display and output various types of information. The external terminal 50 is also provided with a touch panel 75 (see FIG. 1) configured by embedding various sensors and the like in a liquid crystal display panel. More specifically, the touch panel 75 is provided on substantially the entire front surface of the generally plate-like external terminal 50, excluding the periphery (frame portion) thereof, as illustrated in FIG. 1. The touch panel 75 functions as a user interface. In other words, the touch panel 75 functions not only as part of the operation input unit 56a and but also functions as part of the display unit 56b.

The controller 59 in FIG. 3 is a control device that is built into the external terminal 50 and configured to perform overall control of the external terminal 50. The controller 59 is configured as a computer system that includes a CPU and various types of semiconductor memories (RAM and ROM), for example. The controller 59 implements various types of processing units by causing the CPU to execute a predetermined software program (hereinafter, also referred to as an "application program" or simply a "program")

stored in a storage unit (e.g., a semiconductor memory). Note that this program (specifically, a group of program modules) may be recorded in a portable recording medium (or in other words, any of various types of non-transitory computer-readable recording media) such as a USB memory, read from the recording medium, and installed into the external terminal 50. Alternatively, the program may be downloaded via the network 108, for example, and installed into the external terminal 50.

The external terminal 50 has an application program (also simply referred to as an "application) 150 installed therein to control cooperative processing performed in cooperation with the image forming apparatus 10 and the cloud server 90. By executing the application program 150, the external terminal 50 receives the scanned image 200 generated by the image forming apparatus 10 from the image forming apparatus 10 and uses the scanned image 200 to execute processing for generating the electronic document 500.

More specifically, the controller 59 implements various types of processing units including a communication control unit 61, an input control unit 62, a display control unit 63, and a document generation unit 69 by executing the application program 150, for example.

The communication control unit 61 is a processing unit configured to control an operation of communication with the MFP 10 and the cloud server 90, for example, in cooperation with the communication unit 54, for example.

The input control unit 62 is a control unit configured to control operation input to the operation input unit 56*a* (e.g., the touch panel 75). For example, the input control unit 62 controls an operation of receiving touch operation input to the operation screen displayed on the touch panel 75.

The display control unit 63 is a processing unit configured to control a display operation of the display unit 56*b* (e.g., the touch panel 75). The display control unit 63 displays, for example, an operation screen for performing cooperative processing with the MFP 10 on the touch panel 75.

Note that the input control unit 62 and the display control unit 63 are also referred to as a "user interface control unit."

Figure 4:
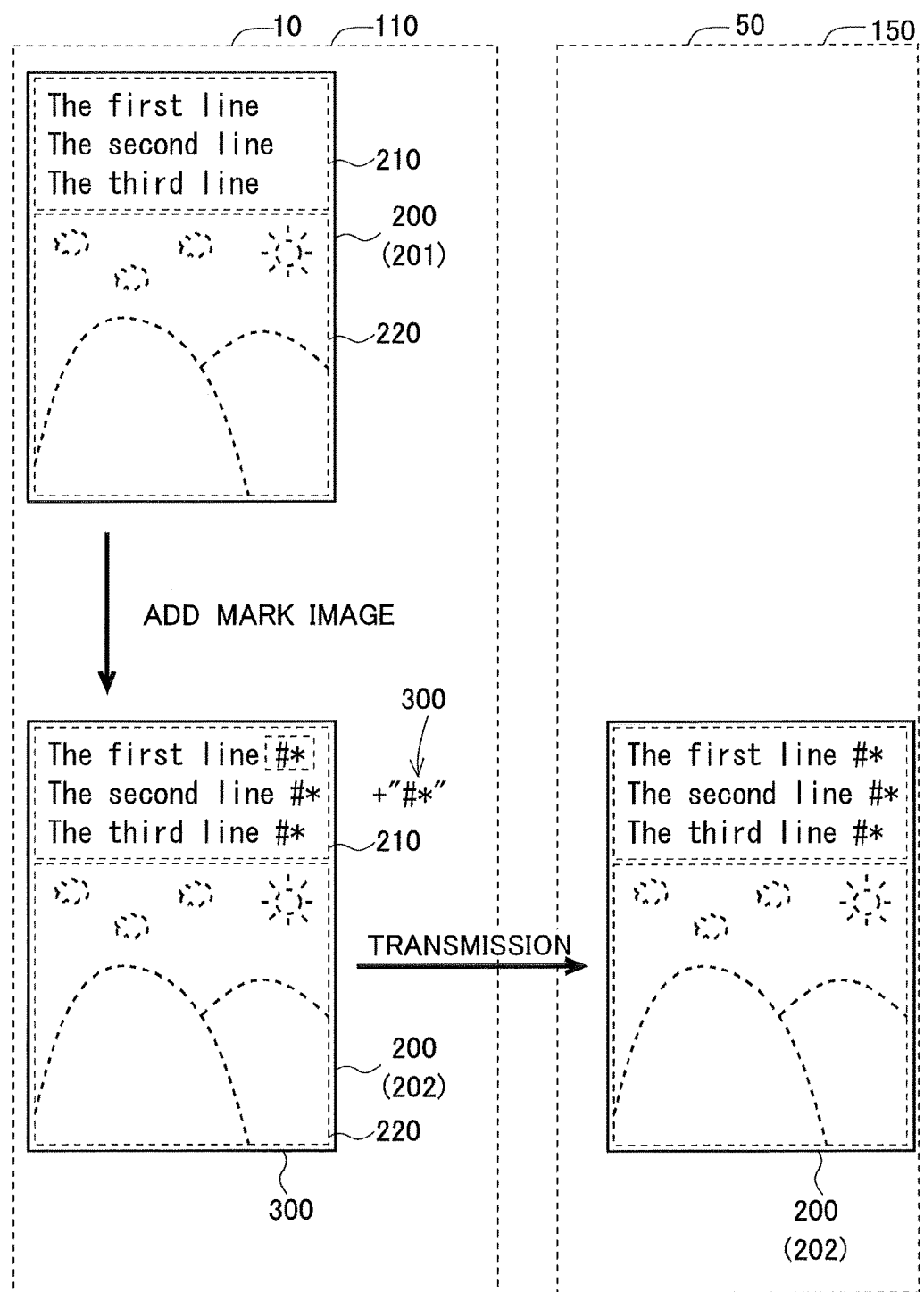
FIG. 4 illustrates an overview of operations performed within an electronic document generation system.

The document generation unit 69 is a processing unit configured to generate the electronic document 500 (see FIG. 4). The document generation unit 69 generates the electronic document 500 (e.g., a searchable PDF document) on the basis of a result of OCR processing (text information (a group of character codes) performed on the scanned image 200.

1-4. Operations

Figure 5:
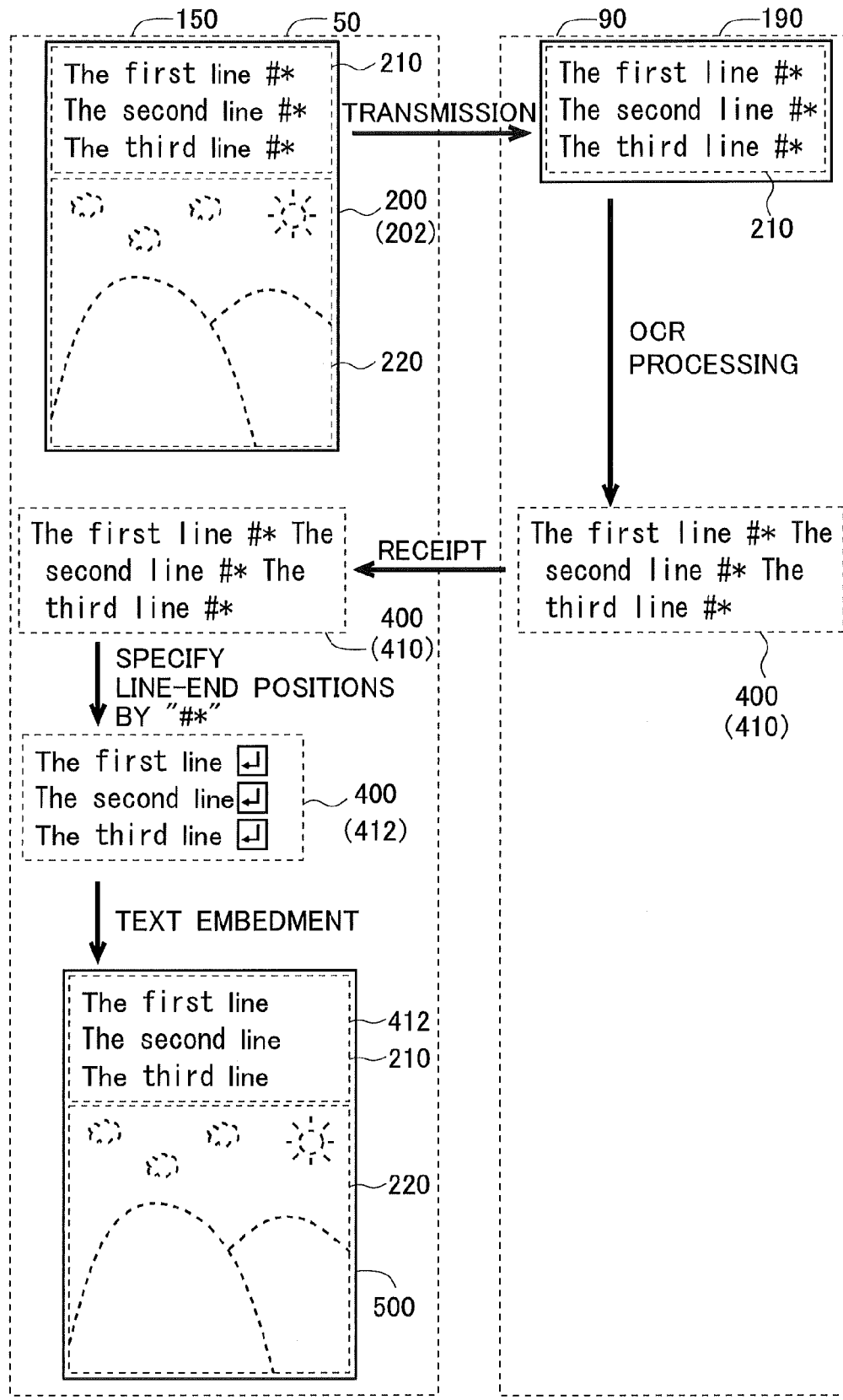
FIG. 5 illustrates an overview of the operations performed by the electronic document generation system.
Figure 6:
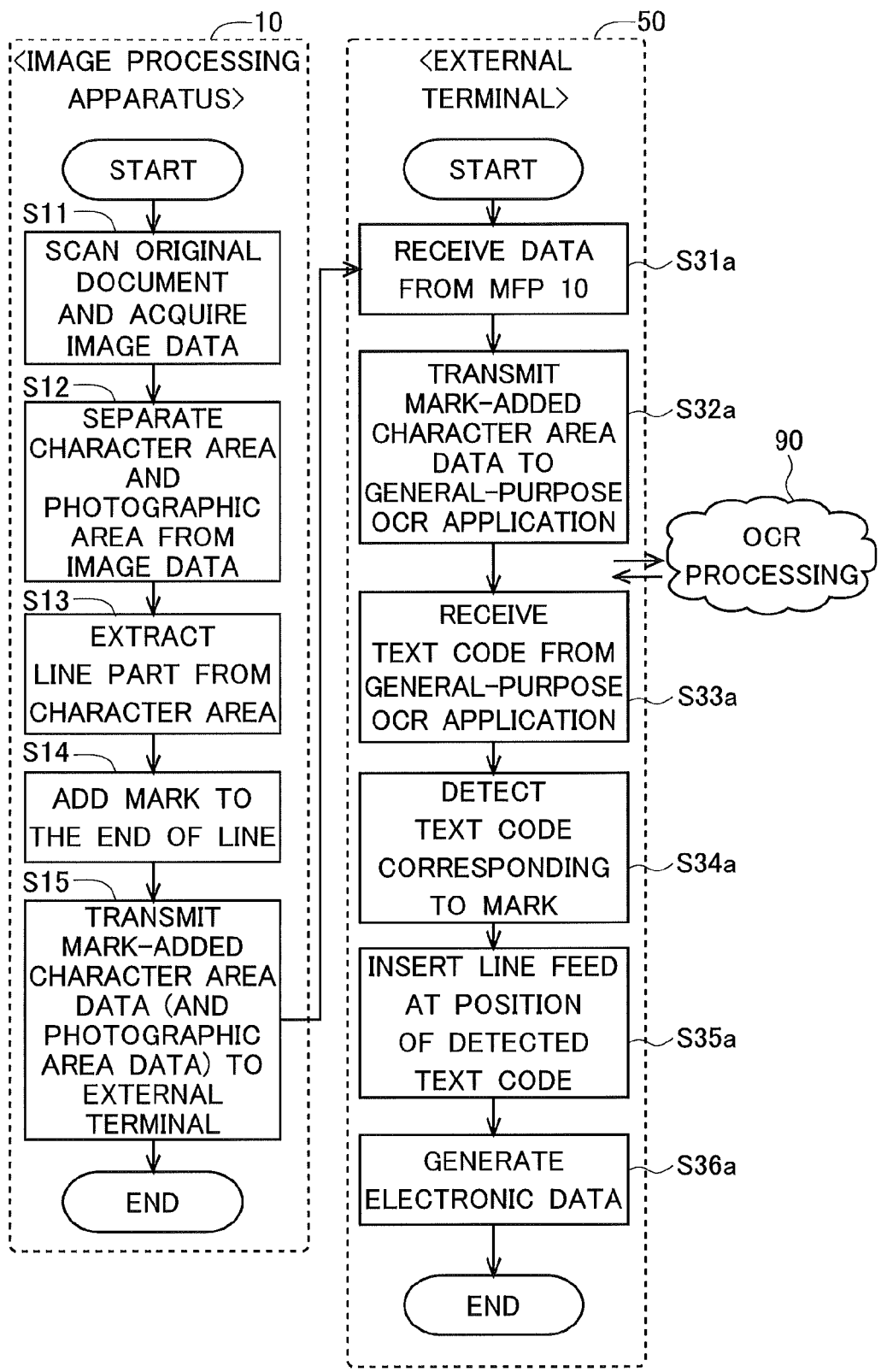
FIG. 6 is a flowchart of the operations performed within the electronic document generation system.

FIGS. 4 and 5 illustrate an overview of operations performed within the electronic document generation system 1. FIG. 4 illustrates operations such as transmitting the scanned image 200 from the image forming apparatus 10 to the external terminal 50, and FIG. 5 illustrates operations such as an operation of the external terminal 50 generating the electronic document 500 on the basis of a result (text data 400) of OCR processing performed on the scanned image 200 in cooperation with the cloud server 90. FIG. 6 is a flowchart of such operations.

The first embodiment describes operations that are outlined as follows. More specifically, as illustrated in FIG. 4, the MFP 10 first generates a scanned image 201, and then generates a scanned image 202 by adding, to the scanned image 201, a line-end identifying character string (here, "#*"), which will be described later, as an image to the end of each line in a character area of the scanned image 201. Then, as illustrated in FIG. 5, the MFP 10 transmits image data regarding the scanned image 202 to the cloud server 90 via the external terminal 50, and the cloud server 90 transmits a result of OCR processing performed on the scanned image 202 to the external terminal 50. The external terminal 50 generates the electronic document 500 by searching for line-end identifying character strings out of the OCR processing result (text data 400) to identify the original line-end positions in the character string of the OCR processing result and dividing the character string of the processing result into a plurality of lines.

A detailed description of the operations performed within the electronic document generation system 1 will now be described with reference to FIGS. 4 to 6.

Generation of Scanned Image

First, a user places an original document to be scanned on an original-document placement part (e.g., an automatic document feeder (ADF) or a glass surface for placing an original document).

The user then operates the external terminal 50 to give an instruction to generate the electronic document 500 to the external terminal 50 and the MFP 10.

More specifically, the user designates a device to execute scanning and a format of the electronic document 500 to be finally generated through the scanning, on an operation screen (not shown) of the application (electronic document generation application) 150 (FIG. 4) installed in the external terminal 50. It is assumed here that the MFP 10 is designated as the device to execute scanning, and searchable PDF (PDF with invisible text) is designated as the format of the electronic document 500. The user then presses an execution start button (a button for starting execution of the processing for generating the electronic document 500) displayed on the operation screen of the electronic document generation application 150, to give an instruction to generate the electronic document (here, a searchable PDF document) 500 to the external terminal 50 and the MFP 10. Note that the searchable PDF document (PCD document with invisible text) is an electronic document in PDF format that includes an image layer (display layer) containing character images and a text layer (non-display layer) in which a result (a group of character codes) of character recognition performed on the character images is embedded without being displayed.

The external terminal 50 receives input of this generation instruction and transfers the generation instruction (specifically, an instruction to generate a scanned image on the basis of the generation instruction) to the MFP 10.

Upon receiving the generation instruction (instruction to generate a scanned image) from the external terminal 50, the MFP 10 starts scanning the original document placed on the original-document placement part (e.g., ADF) of the MFP 10 and generates the scanned image 200 (or 201) of the original document (see the upper left in FIG. 4) (step S11 in FIG. 6).

The MFP 10 also performs area discrimination processing for discriminating various areas in the scanned image 201. More specifically, the MFP 10 discriminates between a character area 210 (FIG. 4) and a non-character area (e.g., a photographic area) 220 (see FIG. 4) in the scanned image 201 and identifies the range (specifically, the position and size) of the character area 210 and the range of the non-character area 220 in the scanned image 200 (step S12).

The MFP 10 (specifically, the auxiliary data generation unit 15) further subjects the scanned image 200 to image processing to extract each line (specifically, partial area corresponding to each line) of a character string in the character area 210 of the scanned image 200 (step S13).

In step S14, the auxiliary data generation unit 15 also subjects the scanned image 200 to image processing to detect a line-end position (end position) of each line. The auxiliary data generation unit 15 then generates "mark images" (described later) based on the line-end identifying character strings, and updates the scanned image 200 by arranging the mark images at the line-end positions of the lines of the character string in the character area 210 of the scanned image 200 (201) (step S14).

The updated scanned image 200 (or 202) (see the lower left in FIG. 4) is an image in which the mark images are added to the original scanned image 201 (200). In other words, the scanned image 202 is an image that includes the image of the character area with mark images (image data of the character area with mark images).

The mark images are obtained by imaging character strings for identifying line-end positions (line-end identifying character strings), which are also referred to as "identification marks." The line-end identifying character strings are predetermined character strings for identifying line-end positions of a sentence (character string) of the OCR processing result in the original document (scanned image). Each line-end identifying character string is configured as a combination of one to several characters, for example. The line-end identifying character string is a character string for identifying a line-end position in a sentence, and is preferably a character string that is unlikely to appear in ordinary sentences. In the present example, a character string "#*" is given as an example of the line-end identifying character string. The present invention is, however not limited to this example, and the line-end identifying character string may be a string of other characters (including numeric characters and symbols).

As illustrated in the lower left of FIG. 4, the identification mark "#*" (line-end identifying character string) (in imaged form) is added to the end of each line in the character area 210 of the scanned image 200 (202). To be more specific, the identification mark "#*" is added to the end of a line for a first character string, "The first line." Similarly, the identification marks "#*" are also added to the end of lines for a second character string, "The Second line" and for a third character string, "The third line." In this way, the identification mark "#*" is added to the position adjacent to and behind a character at the end of each line (rearmost character) (i.e., at the position of the next character).

The MFP 10 (e.g., the communication unit 4 and the communication control unit 11) then transmits the scanned image 202 (specifically, image data of the scanned image) to the external terminal 50 (step S15). To be more specific, the MFP 10 transmits image data of the scanned image 202 that includes image data of the character area with mark images (also referred to as "image data of the mark-added scanned image"). Note that the scanned image 202 may include other data such as image data of the photographic area.

In this way, the image data regarding the scanned image 202 (here, image data of the mark-added scanned image 200) is transmitted from the MFP 10 to the external terminal 50. Note that the image data of the scanned image (mark-added scanned image) 202 including the identification marks is secondary data that is used in the processing for generating the electronic document (specifically, used to identify line-end positions in the original scanned image 201), and is thus also referred to as the "auxiliary data 300." The MFP 10 also transmits information indicating that "#*" represents the identification mark (line-end identifying character string) embedded in the scanned image 200, to the external terminal 50. Note that the data indicating that "#*" represents the line-end identifying character string may also be referred to as the "auxiliary data 300."

OCR Processing and Processing for Generating Electronic Document

Thereafter, the external terminal 50 executes processing of steps S31 (S31*a*) to S36 (S36*a*) by executing the electronic document generation application 150.

First, the external terminal 50 receives and acquires the image data regarding the scanned image 200 (202), for example, from the MFP 10 (step S31*a*).

The external terminal 50 then transmits the image data of the scanned image 200 (specifically, image data of the scanned image 202 including the image of the character area with mark images) and an instruction to perform OCR processing on that image data (OCR processing execution instruction) to the cloud server 90 (specifically, the general-purpose OCR application) (step S32 (S32*a*)). It is assumed here that optical character recognition processing (OCR processing) is performed on the scanned image 200 as cooperative processing performed in cooperation with the cloud server 90. The OCR processing as the cooperative processing is performed by the cloud server 90.

The cloud server 90 (application 190) that has received the OCR processing execution instruction and the image data regarding the scanned image 200 (202) performs OCR processing on the basis of the OCR processing execution instruction and the image data.

The upper section of FIG. 5 illustrates that image data of the character area image with mark images (an image of a character string that spans three lines) is transmitted from the external terminal 50 to the cloud server 90. The cloud server 90 performs OCR processing on the received image data, recognizes a character string included in the image data, and generates text data (a group of character codes) 400 (410) of the character string. The cloud server 90 then transmits the text data (text information) 400 of the character string as an OCR processing result (result of the optical character recognition processing performed on the mark-added scanned image) to the external terminal 50.

In step S33 (S33*a*), the external terminal 50 receives this processing result from the cloud server 90. The character string (text data) of the processing result includes not only the character string included in the original scanned image 201 but also the line-end identifying character strings "#*." For example, FIG. 5 illustrates that a character string "The first line #* The second line #* The third line #*" that includes the line-end identifying character strings "#*" is transmitted from the cloud server 90 to the external terminal 50.

In step S34 (S34*a*), the external terminal 50 identifies the original line-end positions in the character string of the processing result on the basis of the processing result (text data 410) and the line-end identifying character strings (auxiliary data 300). Specifically, the external terminal 50 performs search processing (character search) for searching the text data 410 for the line-end identifying character strings, which correspond to the mark images, to detect the existential position of each identification mark "#*" in the text data 410 as a line-end position (of each line).

Step S35 (S35*a*) is processing for modifying the text data 410, which is the result of processing performed on the character area image with marks. More specifically, the identification marks detected in step S34 are deleted from the mark positions (detected positions), and line-feed codes (line-feed information) are inserted, instead of the identification marks. By using the line-feed codes inserted at the line-end positions, instead of the identification marks, the end of each line becomes recognizable in the character string where the end of each line has been unclear, and the character string can be divided into a plurality of lines.

In step S36, the external terminal 50 (e.g., the document generation unit 69) arranges the character string included in the text data 410 (412), which has been updated in step S35a, within the electronic document 500 (see also FIG. 5). Accordingly, the character string included in the text data 410 (412) is divided into a plurality of lines and arranged in the scanned image 200, which is embedded in the electronic document 500 (PDF document). To be more specific, the document generation unit 69 embeds the text data 410 (412) in the electronic document 500 while hiding the text data 410. In other words, the text data divided into a plurality of lines by the line-feed codes is arranged in the text layer (non-display layer) of the searchable PDF document.

When the scanned image includes the non-character area (e.g., photographic area) 220, the image of the non-character area is also arranged in the electronic document 500.

Through the above-described operations, the electronic document (searchable PDF document) 500 is generated.

The lower left section of FIG. 5 illustrates an example of the electronic document 500 (searchable PDF document) generated through the above-described operations. Here, a character string of three lines that start at the same positions as in the original document is displayed in the character area 210 of the scanned image 200 in the electronic document 500. In this searchable PDF document, the character string of the OCR processing result is embedded without being displayed, while the image of the original character area 210 is displayed without deletion. Note that when the scanned image 200 includes the non-character area 220, the non-character area 220 is displayed as-is in the corresponding area of the electronic document 500 without being subjected to OCR processing.

According to the first embodiment described above, the image forming apparatus 10 generates the auxiliary data 300 (image data of the scanned image 202 and/or information regarding line-end identifying character strings), which is used in the processing for generating the electronic document 500, and transmits the auxiliary data 300 to the external terminal 50. Then, the external terminal 50 uses the auxiliary data 300 to generate the electronic document 500 based on the image data regarding the scanned image in cooperation with the cloud server 90 (external cooperative device). Using the auxiliary data 300 allows the external terminal, when generating an electronic document based on a scanned image received from the image forming apparatus in cooperation with another external cooperative device, to generate an excellent electronic document.

To be more specific, the external terminal 50 receives the image data of the mark-added scanned image from the image forming apparatus 10 and transmits this image data to the cloud server 90. The external terminal 50 also generates the electronic document 500 by complementing the processing result received from the cloud server 90 with the auxiliary data 300 (line-end identifying character strings). More specifically, the external terminal 50 identifies the original line-end positions in the character string of the processing result received from the cloud server 90 on the basis of not only that processing result but also the auxiliary data 300 (line-end identifying character strings) received from the MFP 10, and generates the electronic document 500 in which the character string of the processing result is divided into a plurality of lines.

These operations can also be described as follows. More specifically, the external terminal 50 receives image data of the mark-added scanned image as the auxiliary data 300 from the image forming apparatus 10 and transmits the image data of the mark-added scanned image to the cloud server 90. The external terminal 50 also complements the processing result received from the cloud server 90 with the line-end identifying character strings to generate the electronic document 500. To be more specific, the external terminal 50 identifies the original line-end positions in the character string of the processing result received from the cloud server 90 on the basis of not only that processing result but also the line-end identifying character strings received from the MFP 10, and generates the electronic document 500 in which the character string of the processing result is divided into a plurality of lines.

If the original scanned image 201 is transmitted to the cloud server 90, information regarding the line-end position of each line of a sentence in the scanned image 201 will not be included in the OCR processing result, which is transmitted from the cloud server 90 to the external terminal 50. If this processing result is embedded as-is in the electronic document 500, different characters other than original characters may be arranged at the end of each line (and the beginning of the next line) due to missing of line-end information, as described above.

On the contrary, the above-described embodiment enables appropriately determining the line-end position of each line and thereby generating a more excellent electronic document. To be more specific, it is possible to generate a searchable PDF document (electronic document 500) in which a character string of the text of the OCR processing result is arranged appropriately at its original position.

To resolve the above-described problem, it is also conceivable for the external terminal 50 (not the MFP 10) to perform processing such as detecting line-end positions as described above. However, much effort is required to develop a new program for causing the external terminal 50 to implement processing such as detecting line-end positions. In contrast, in the above-described embodiment, the MFP 10 can easily implement processing such as detecting line-end positions by using some (function of detecting line-end positions) of OCR functions for MFPs in already-developed programs. That is, the MFP 10 can easily generate the auxiliary data 300. Hence, it is relatively easy to construct the electronic document generation system.

The above-described embodiment uses the OCR processing service provided by the external cooperative device (cloud server 90). This enables OCR processing to be performed by a different device (cloud server) other than the client device (e.g., the external terminal 50) that has requested the execution of the OCR processing. It is thus possible to reduce the processing load on the client device.

Additionally, in the above-described embodiment, the processing for generating the electronic document 500 is performed by a different device (external terminal 50) other than the MFP 10, which is an apparatus for generating the scanned image 200. This reduces the processing load on the MFP 10. In other words, it is possible to appropriately distribute the processing load between the MFP 10 and the external terminal 50.

2. Second Embodiment

A second embodiment is a variation of the first embodiment. The following description focuses on differences from the first embodiment.

Figure 7:
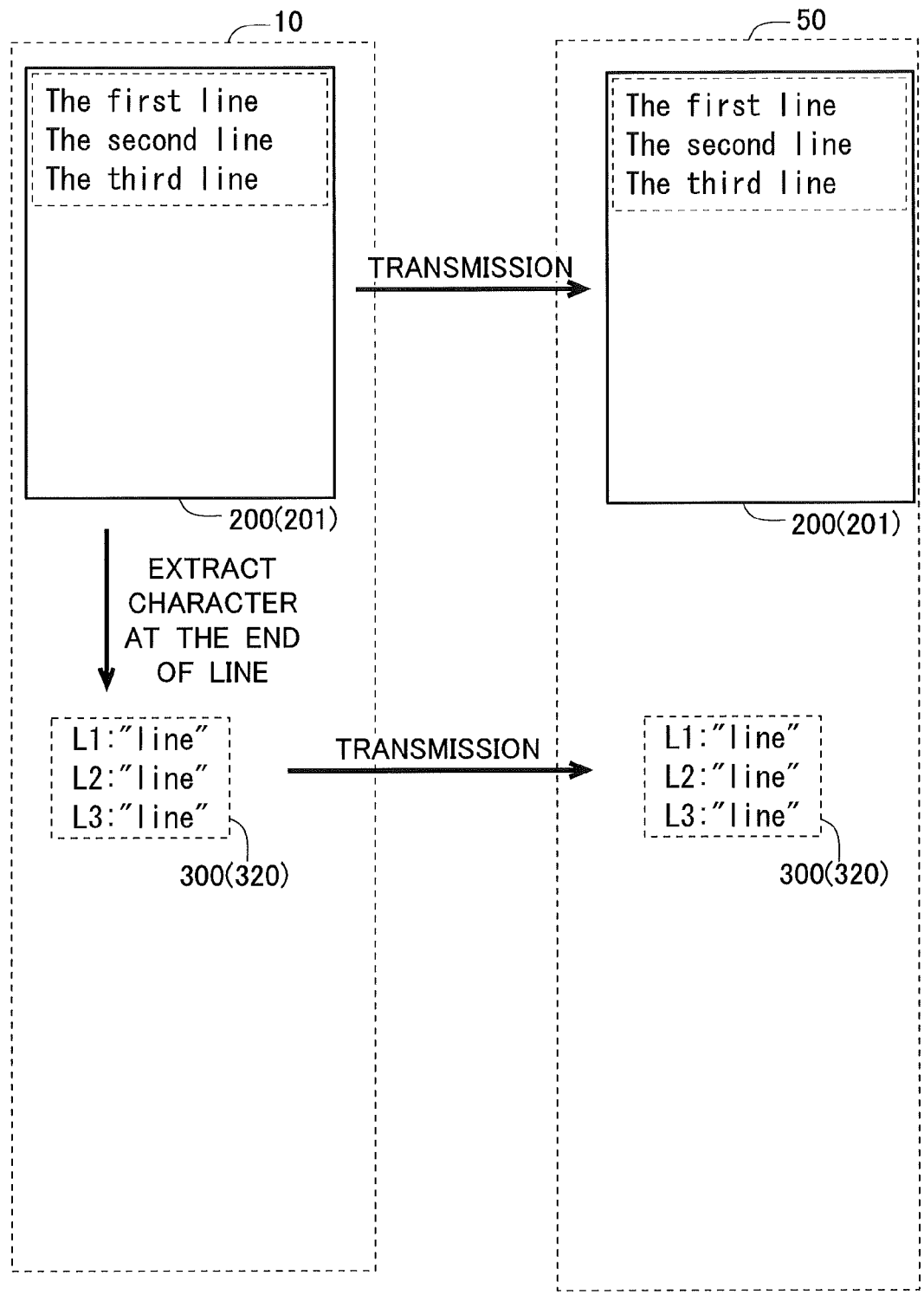
FIG. 7 illustrates an overview of operations according to a second embodiment.
Figure 8:
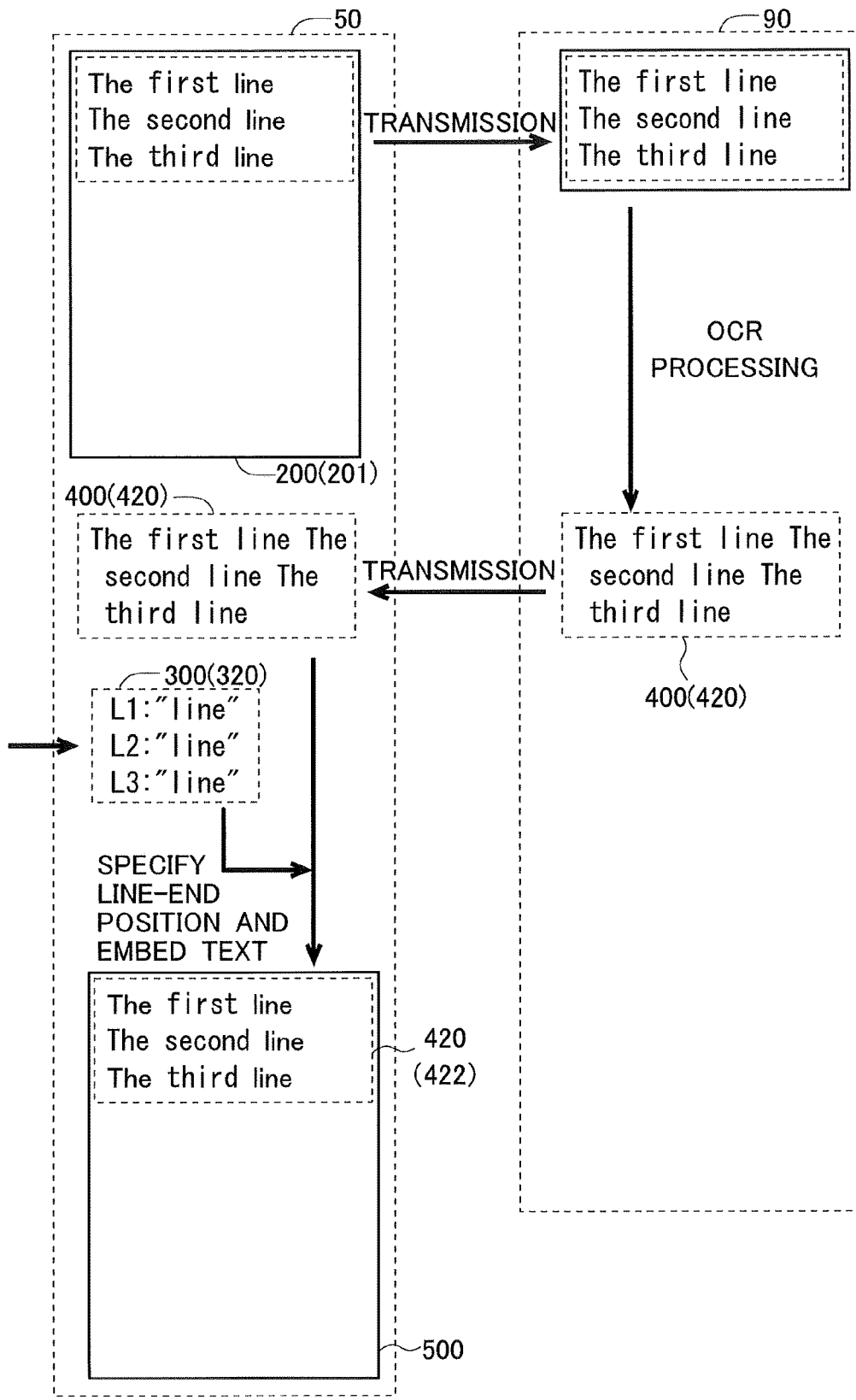
FIG. 8 illustrates an overview of operations according to the second embodiment.

The second embodiment describes operations that are outlined as follows. More specifically, as illustrated in FIGS. 7 and 8, first, the MFP 10 generates a scanned image 201 and transmits image data regarding the scanned image 201 to the cloud server 90 via the external terminal 50, and the cloud server 90 transmits a result of OCR processing (text data 400 (420)) performed on the scanned image 201 to the external terminal 50. The MFP 10 also detects a line-end character string in each line of a character string in the scanned image 201 through OCR processing, and generates the line-end character string of each line (specifically, a character code for each character in the line-end character string) as auxiliary data 300 (320) (FIG. 7). The MFP 10 then transmits (not only the scanned image 201 but also) the auxiliary data 320 to the external terminal 50. The external terminal 50 identifies the original line-end positions in the character string of the OCR processing result (text data 420) received from the cloud server 90 on the basis of the auxiliary data 320 received from the MFP 10 and the OCR processing result, and divides the character string of the OCR processing result into a plurality of lines, thereby generating the electronic document 500.

These operations will now be described in detail with reference to FIGS. 7 to 9. Note that FIGS. 7, 8, and 9 illustrate operations according to the second embodiment and correspond respectively to FIGS. 4, 5, and 6 of the first embodiment.

Figure 9:
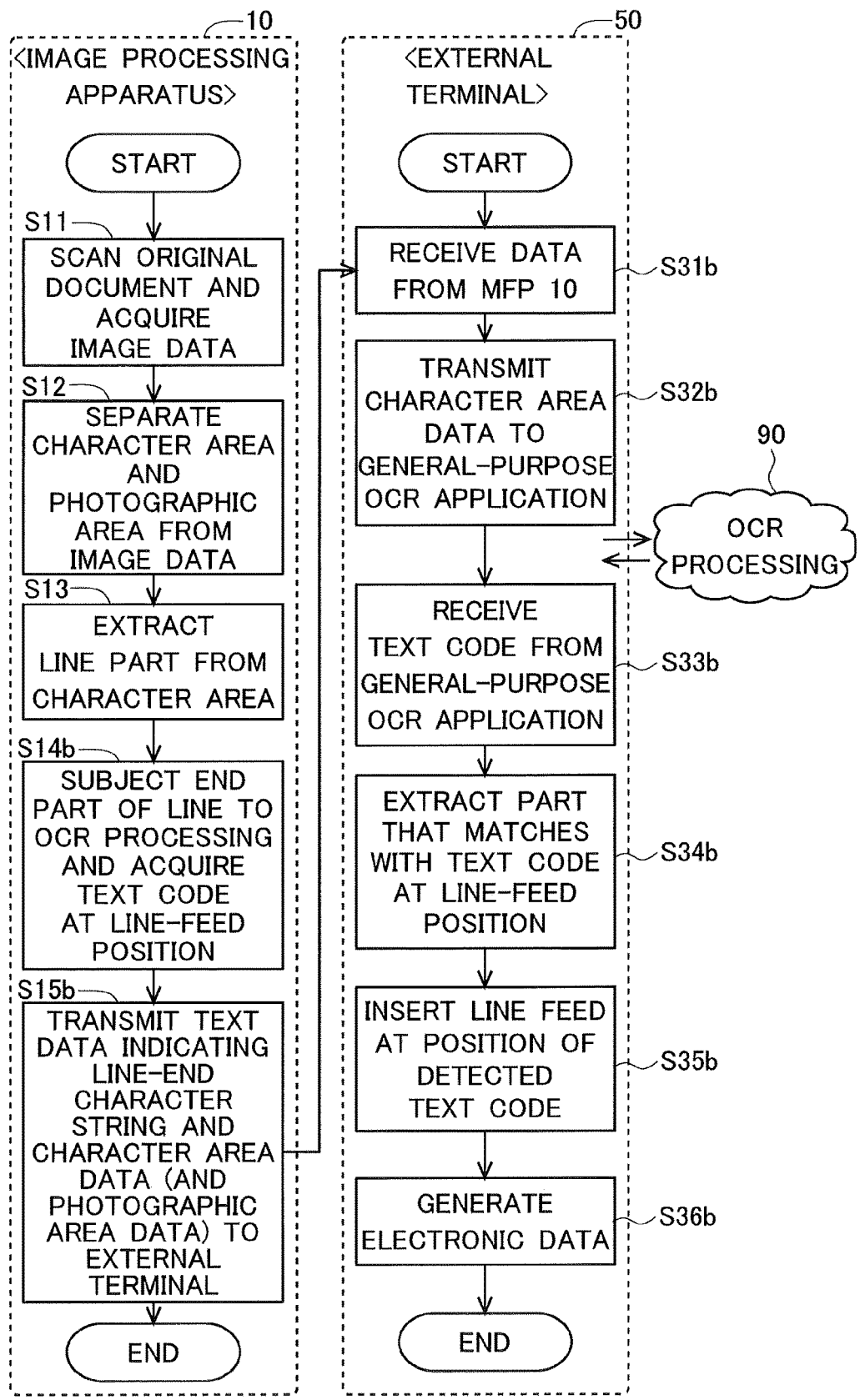
FIG. 9 is a flowchart of the operations according to the second embodiment.

First, the processing of steps S11 to S13 is performed in the same manner as in the first embodiment, as illustrated in FIG. 9.

Next, in step S14b, the auxiliary data generation unit 15 of the MFP 10 performs OCR processing on each line-end area (e.g., an area located at the end of each line and having a predetermined ratio (e.g., 30%) of width to the entire width of the line) of each line area (character string image) extracted in step S13. This processing detects a line-end character string (specifically, a character code of each character in the line-end character string) for each line of the character string in the scanned image 201 (specifically, the character area of the scanned image). The MFP 10 then generates text data including information about the line-end character string of each line as the auxiliary data 300 (320). For example, the text data 320 in FIG. 7 includes a character string "line" that is detected as the line-end character string for the first line, a character string "line" that is detected as the line-end character string for the second line, and a character string "line" that is detected as the line-end character string for the third line.

Here, the size (width) of the line-end area can appropriately be defined in consideration of the processing load on the MFP 10, for example. For example, an area that is located at the end of each line and has a width that is several to 50 percent of the entire width of the line may be defined as the line-end area. To be more specific, when priority is given to the accuracy in the processing for detecting line-end positions, a relatively large (long) area (e.g., a line-end area corresponding to 10 characters) may be defined as the line-end area. On the contrary, when priority is given to the speed in the processing for detecting line-end positions, a relatively small (short) area (e.g., a line-end area corresponding to three characters) may be defined as the line-end area. The size (width) of the line-end area is preferably able to be changed by user's setting operations, for example.

In step S15b, the MFP 10 transmits the scanned image 201 (specifically, image data of the scanned image 201) and the auxiliary data (text data 320) to the external terminal 50.

Thereafter, the external terminal 50 performs processing of steps S31 (S31b) to step S36 (S36b).

First, the external terminal 50 receives and acquires the image data regarding the scanned image 200 (201) from the MFP 10 (step S31).

Next, the external terminal 50 transmits the image data regarding the scanned image 200 (specifically, image data of the original scanned image 201) and an instruction to perform OCR processing on this image data (OCR processing execution instruction) to the cloud server 90 (specifically, the general-purpose OCR application 190) (step S32 (S32b)).

The cloud server 90 (application 190) that has received the OCR processing execution instruction and the image data regarding the scanned image 200 (201) performs OCR processing on the basis of the OCR processing execution instruction and the image data.

The cloud server 90 performs OCR processing on the image data received from the external terminal 50, recognizes a character string included in the image data, and generates text data (a group of character codes) 400 (420) of the character string. The cloud server 90 then transmits the text data (text information) 420 of the character string as a result of the OCR processing (a result of optical character recognition processing performed on the scanned image 201) to the external terminal 50.

In step S33 (S33b), the external terminal 50 receives this processing result (text data 420) from the cloud server 90. For example, FIG. 8 illustrates that a character string "The first line The second line The third line" is transmitted from the cloud server 90 to the external terminal 50. Note that this processing result does not include information indicating line-feed positions (line-end positions).

In step S34 (S34b), the external terminal 50 identifies the original line-end positions in the character string of the processing result (text data 420) on the basis of the processing result and the auxiliary data 320. More specifically, the external terminal 50 detects the position of each line-end character string in the text data 420 as a line-end position (of each line) through processing (character search) for searching for a line-end character string of each line (also referred to as a "search character string") included in the auxiliary data 320.

To be more specific, the degree of matching (also referred to as the "degree of conformity") between the text data 420 (comparison target character string) and a search character string is obtained while shifting the position of the search character string in the comparison target character string, one character at a time. If the degree of matching is higher than a predetermined threshold value TH1 (e.g., 70%), it is determined that the search character string exists at the position of the comparison target character string. In other words, that position in the comparison target character string of the text data 420 is determined as a line-end position in the text data 420.

Here, the threshold value TH1 may be 100%, but is preferably a value less than 100%. In this case, it is possible to avoid or reduce the possibility of erroneously determining a line-end position due to, for example, misrecognition by the cloud server 90. For example, misrecognition by the cloud server 90 or other events can cause a situation in which the original character string "line" in the scanned image 200 is regarded and included as a different character string such as "tine" in the text data 420. The above degree of matching calculated when the search character string "line" exists at the position of the comparison target character string "tine" is 75% (three characters match out of the four characters). If the threshold value TH1 is set to 100%, it will be determined that the position of the comparison target character string "tine" is not a line-end position. On the other hand, if the threshold value TH1 is set to a value less than 100% (e.g., 70%), a normal determination result is obtained, i.e., the position of this comparison target character string "tine" is determined as a normal line-end position. In other words, it is possible to avoid or reduce the possibility that misrecognition by the cloud server 90 or other events will cause a situation in which the position of the comparison target character string "tine" is determined as not being a normal line-end position.

In step S35 (S35b), the text data 420 is modified by inserting a line-feed code (line-feed information) at the position (line-end position) of each line-end character string detected in step S34. By using the line-feed codes inserted at the line-end positions, it is possible to recognize the end of each line of a character string in which the end of each line is unknown and to divide this character string into a plurality of lines.

In step S36 (S36b), the external terminal 50 (e.g., the document generation unit 69) arranges the character string included in the text data 420 (422) modified in step S35b within the electronic document 500 (see also FIG. 8). The character string included in the text data 420 (422) is divided into a plurality of lines and arranged within the scanned image 200, which is captured into the electronic document 500 (PDF document). This text data 422 is embedded in the electronic document 500 without being displayed.

Note that when the scanned image includes a non-character area (e.g., a photographic area), an image of the non-character area is also arranged within the electronic document 500.

In this way, the electronic document (searchable PDF document) 500 is generated.

As described above, in the second embodiment, the external terminal 50 (e.g., the document generation unit 69) complements the processing result received from the cloud server 90 with the auxiliary data 300 to generate the electronic document 500. More specifically, the external terminal 50 specifies the original line-end positions in the character string of the processing result 420 received from the cloud server 90 on the basis of not only this processing result but also the auxiliary data 320 received from the MFP 10 and divides the character string of the processing result into a plurality of lines, thereby generating the electronic document 500.

These operations can also achieve the same effects as those of the first embodiment. More specifically, for example, the external terminal 50 that uses the auxiliary data 300 when generating an electronic document on the basis of the scanned image received from the image forming apparatus 10 in cooperation with another external cooperative device 90 can generate an excellent electronic document. In particular, it is possible to determine the line-end position of each line more appropriately and to thereby generate a more excellent electronic document. To be more specific, it is possible to generate a searchable PDF document (electronic document 500) in which the text character string of the OCR processing result is arranged appropriately at the original position.

In the above-described second embodiment, the processing for detecting a line-end character string for each line in the scanned image (step S14b) has already been completed before receipt of the OCR processing execution instruction (step S15b), the present invention is not limited to this example. For example, after the OCR processing execution instruction has been transmitted along with the image data regarding the scanned image 200 to the cloud server 90, the auxiliary data generation unit 15 of the MFP 10 may perform the processing for detecting a line-end character string for each line of a character string in the scanned image 200, in parallel with the OCR processing performed by the cloud server 90. This is efficient because the cloud server 90 can relatively early start performing the OCR processing on the scanned image without waiting for the completion of the processing for detecting a line-end character string for each line of the character string in the scanned image (OCR processing performed on line-end character strings by the MFP 10). In particular, such parallel execution of the OCR processing performed by the cloud server 90 and the OCR processing performed on line-end areas by the MFP 10 enables efficient execution of processing.

3. Third Embodiment

A third embodiment is a variation of the second embodiment. The following description focuses on differences from the second embodiment.

The above second embodiment (and first embodiment) describes an embodiment in which the auxiliary data 300 is used to specify the line-end position of each line in the character area of a scanned image.

The third embodiment describes an embodiment in which the auxiliary data 300 is used to specify the font size of characters of each line in the character area of the scanned image. The third embodiment uses auxiliary data 330 (described later) regarding the font size, instead of the auxiliary data 320 used in the second embodiment.

Figure 10:
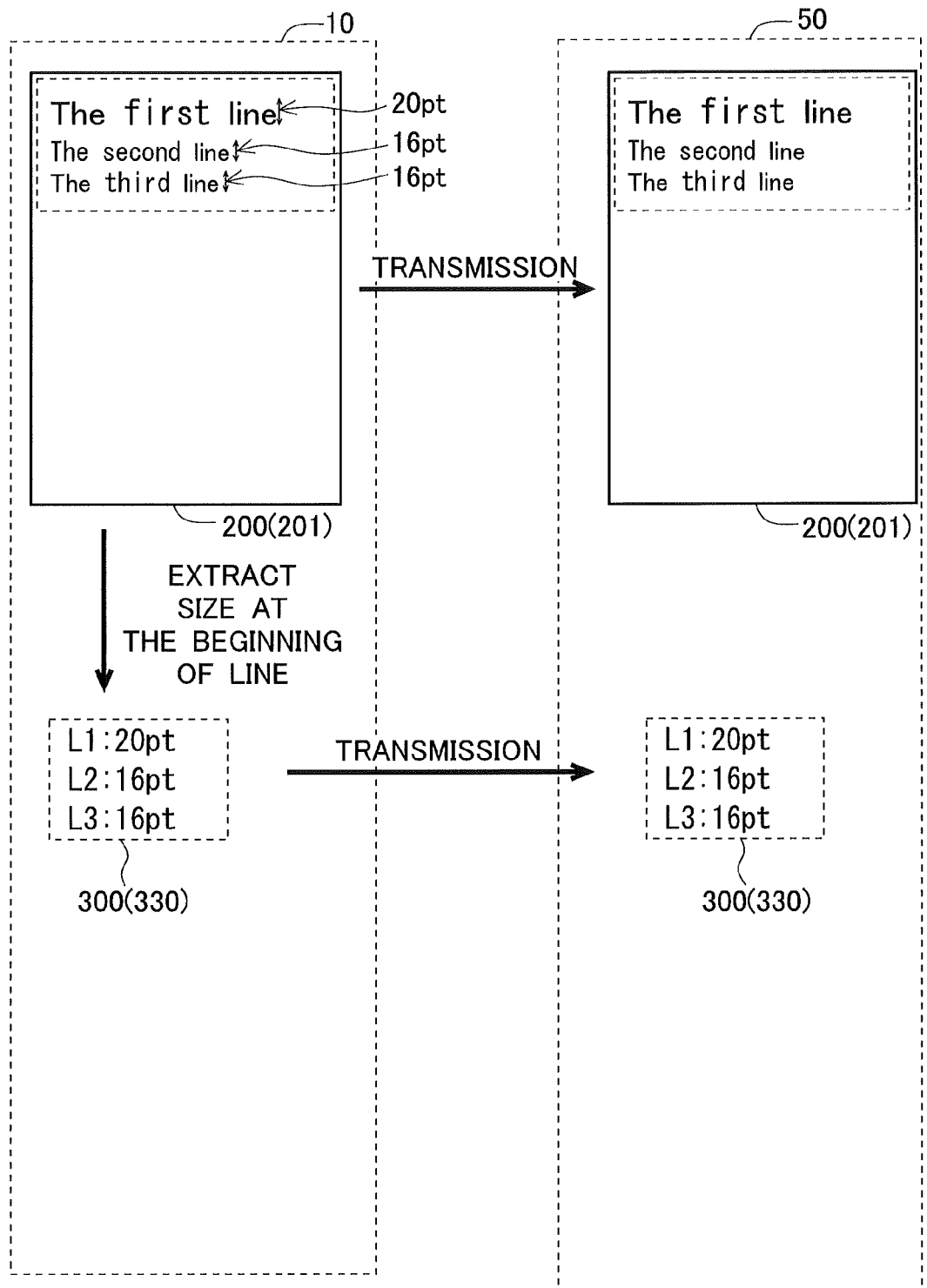
FIG. 10 illustrates an overview of operations according to a third embodiment.
Figure 11:
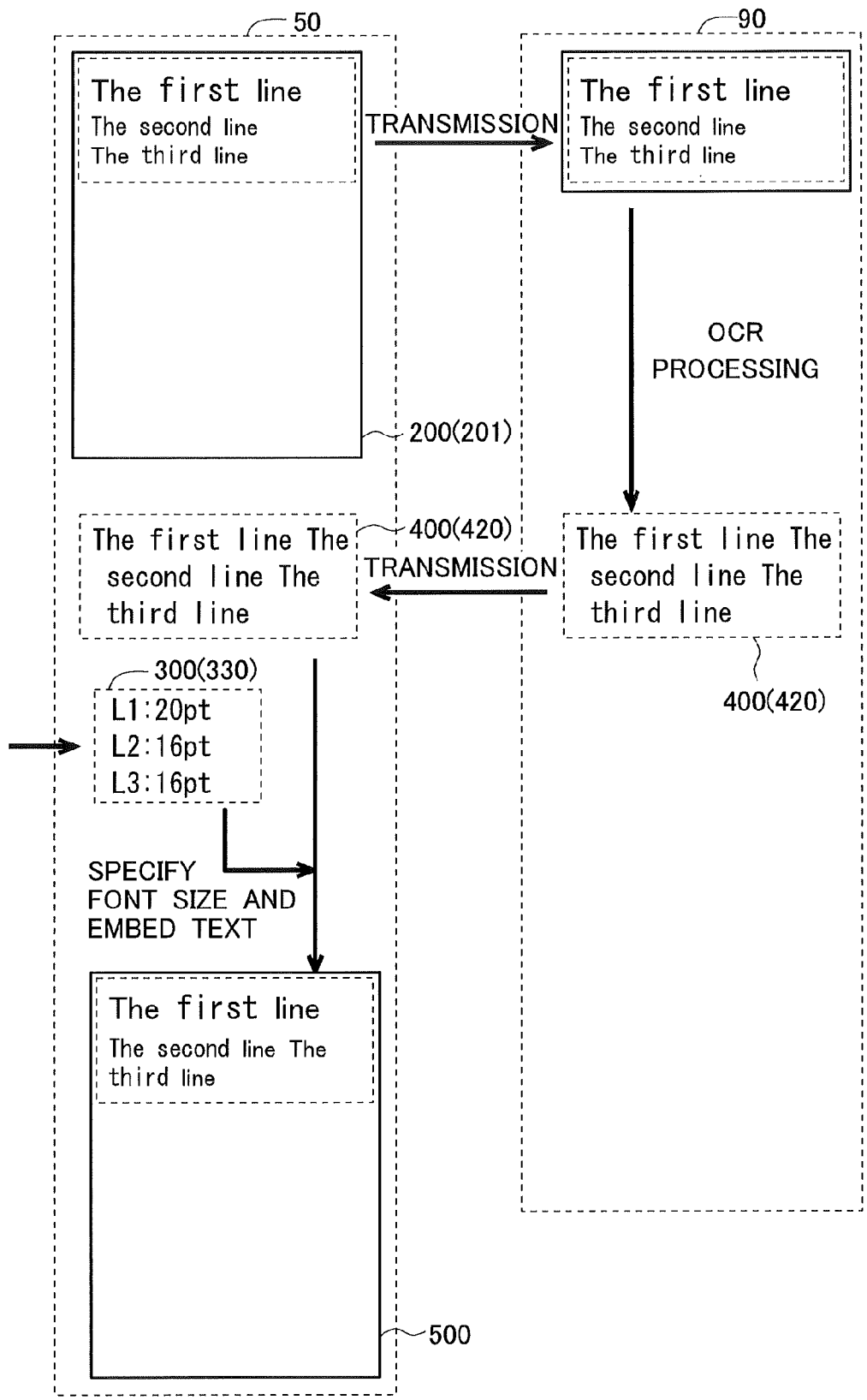
FIG. 11 illustrates an overview of operations according to the third embodiment.
Figure 12:
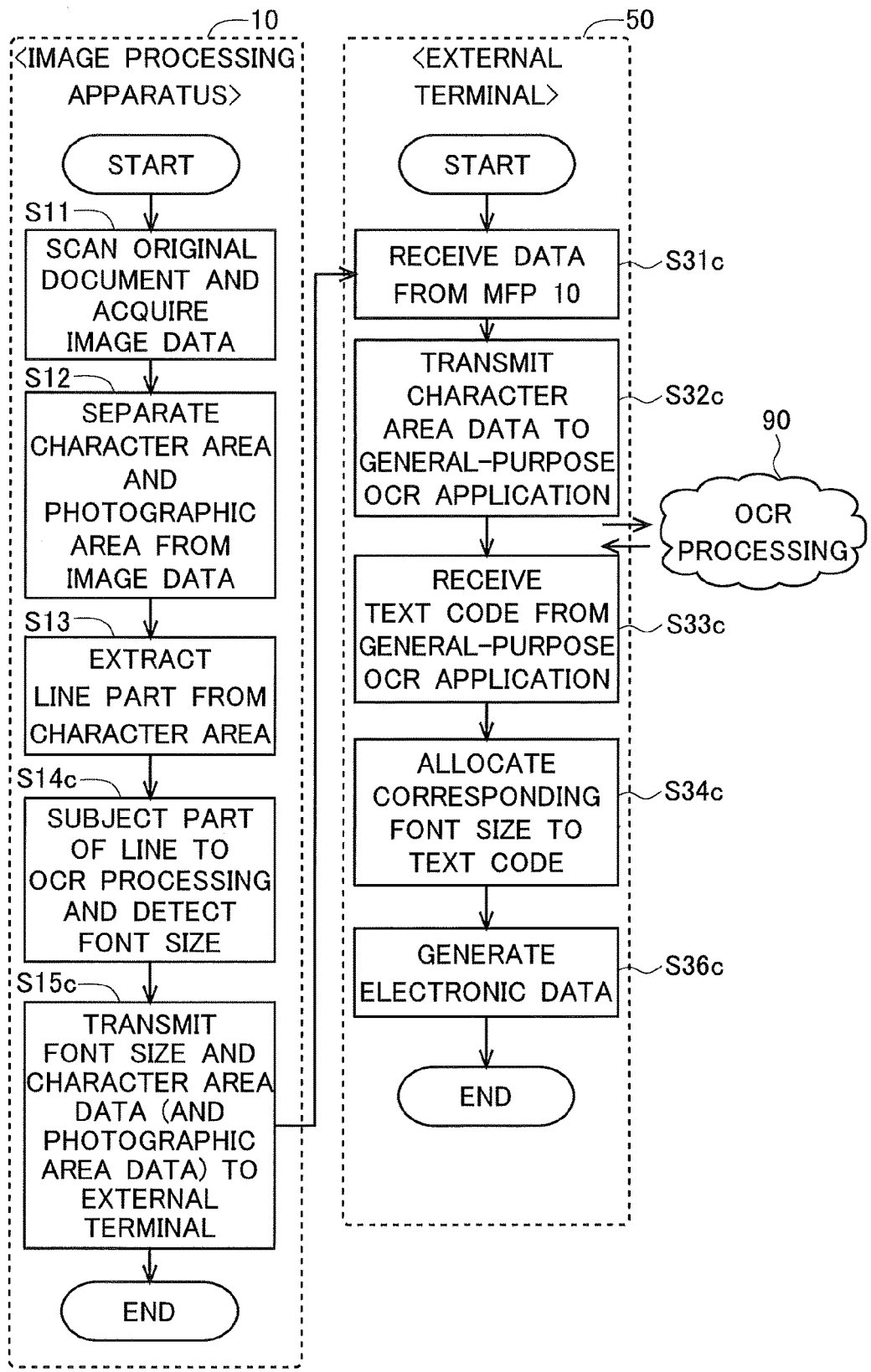
FIG. 12 is a flowchart of the operations according to the third embodiment.

Below is a detailed description of such operations with reference to FIGS. 10 to 12. FIGS. 10, 11, and 12 illustrate operations according to the third embodiment and correspond respectively to FIGS. 7, 8, and 9 of the second embodiment.

First, as illustrated in FIG. 12, the processing of steps S11 to S13 is performed in the same manner as in the second embodiment.

Next, in step S14c, the auxiliary data generation unit 15 of the MFP 10 performs processing (font-size detection processing) for detecting the size of characters in each line area (character string image) extracted in step S13 (see the upper left of FIG. 10). More specifically, image processing is performed to detect the height of an area where characters really exist in each line area, and detect (specify) the font size corresponding to the detected height. This processing is performed for each of a plurality of lines in the character area to detect the font size for each line.

Then, the MFP 10 generates data 330 that includes information regarding the font size for each line, as the auxiliary data 300. For example, the auxiliary data 330 in FIG. 10 includes information indicating the specified font size for each line (i.e., the font size of 20 points (pt) for the first line, the font size of 16 pt for the second line, and the font size of 16 pt for the third line).

In step S15c, the MFP 10 transmits not only the scanned image 201 (specifically, image data of the scanned image) but also the auxiliary data 330 to the external terminal 50.

Thereafter, the external terminal 50 performs processing from step S31c onward. Steps S31c, S32c, and S33c respectively perform the same processing as steps S31b, S32b, and S33b described in the second embodiment. The cloud server 90 also performs the same processing as in the second embodiment and transmits the text data 400 (420) as a result of OCR processing (processing result of optical character recognition performed on the scanned image 201) to the external terminal 50.

In step S34c, the external terminal 50 determines the font size for each line in the character string of the processing result (text data 420) on the basis of the auxiliary data 330.

In step S36c, the external terminal 50 arranges the character string included in the text data 420 received in step S33c within the electronic document 500 (see also FIG. 11). At this time, the font size for each line in the character string included in the text data 420 is set to the font size described in the auxiliary data 330 received from the MFP 10. In other words, the font size of the character string of each line arranged within the electronic document 500 is set to the font size that has been determined by the MFP 10 in step S14c and received from the MFP 10 in step S31c.

For example, the font size of characters arranged in the first line in the electronic document 500 is set to 20 pt, the font size of characters arranged in the second line is set to 16 pt, and the font size of characters arranged in the third line is set to 16 pt. Note that the text data 420 is embedded in the electronic document 500 without being displayed. Consequently, as illustrated in, for example, FIG. 11, the character string "The first line" having a font size of 20 pt is embedded in the first line, the character string "The second line" having a font size of 16 pt is embedded in the second line, and the character string "The third line" having a font size of 16 pt is embedded in the third line.

When the scanned image includes a non-character area (e.g., a photographic area), an image of the non-character area is also arranged within the electronic document 500.

In this way, the electronic document (searchable PDF document) 500 is generated.

As described above, in the third embodiment, the external terminal 50 (e.g., the document generation unit 69) complements the processing result 420 received from the cloud server 90 with the auxiliary data 330 to generate the electronic document 500. The external terminal 50 specifies the original font sizes for the character string of the processing result 420 received from the cloud server 90 on the basis of not only this processing result but also the auxiliary data 330 received from the MFP 10, thereby generating the electronic document 500 in which the character string of the processing result 420 is embedded by using an appropriate font size (appropriate size) for each line.

Through such operations, the external terminal 50 that uses the auxiliary data 330 when generating an electronic document on the basis of the scanned image received from the image forming apparatus 10 in cooperation with another external cooperative device 90 can generate an excellent electronic document. In particular, it is possible to determine the font size for each line more appropriately and to thereby generate a more excellent electronic document. To be more specific, it is possible to generate a searchable PDF document (electronic document 500) in which the text character string of the OCR processing result is arranged appropriately with the original font size for each line.

In this example, the processing for detecting the font size for each line in the scanned image (step S14b) has already been completed before receipt of the OCR processing execution instruction (step S15b), the present invention is not limited to this example. For example, after the OCR processing execution instruction has been transmitted along with the image data regarding the scanned image 200 to cloud server 90, the auxiliary data generation unit 15 of the MFP 10 may perform the processing for detecting the font size for each line of the character string in the scanned image, in parallel with the OCR processing performed by the cloud server 90. This is efficient because the cloud server 90 can relatively early start performing the OCR processing on the scanned image without waiting for the completion of the processing for detecting the font size for each line of the character string in the scanned image (OCR processing performed on line-end character strings by the MFP 10). In particular, such parallel execution of the OCR processing performed by the cloud server 90 and the processing for detecting the font size for each line, performed by the MFP 10, enables efficient execution of processing.

4. Fourth Embodiment

A fourth embodiment is a variation of the third embodiment. The following description focuses on differences from the third embodiment.

The above third embodiment describes an embodiment in which the auxiliary data 330 is used to specify the font size of characters in each line of the character area in the scanned image.

The fourth embodiment describes an embodiment in which auxiliary data 340 (described later) that indicates position information about a plurality of areas in a scanned image is used to adjust the positions of the plurality of areas in the scanned image.

Figure 13:
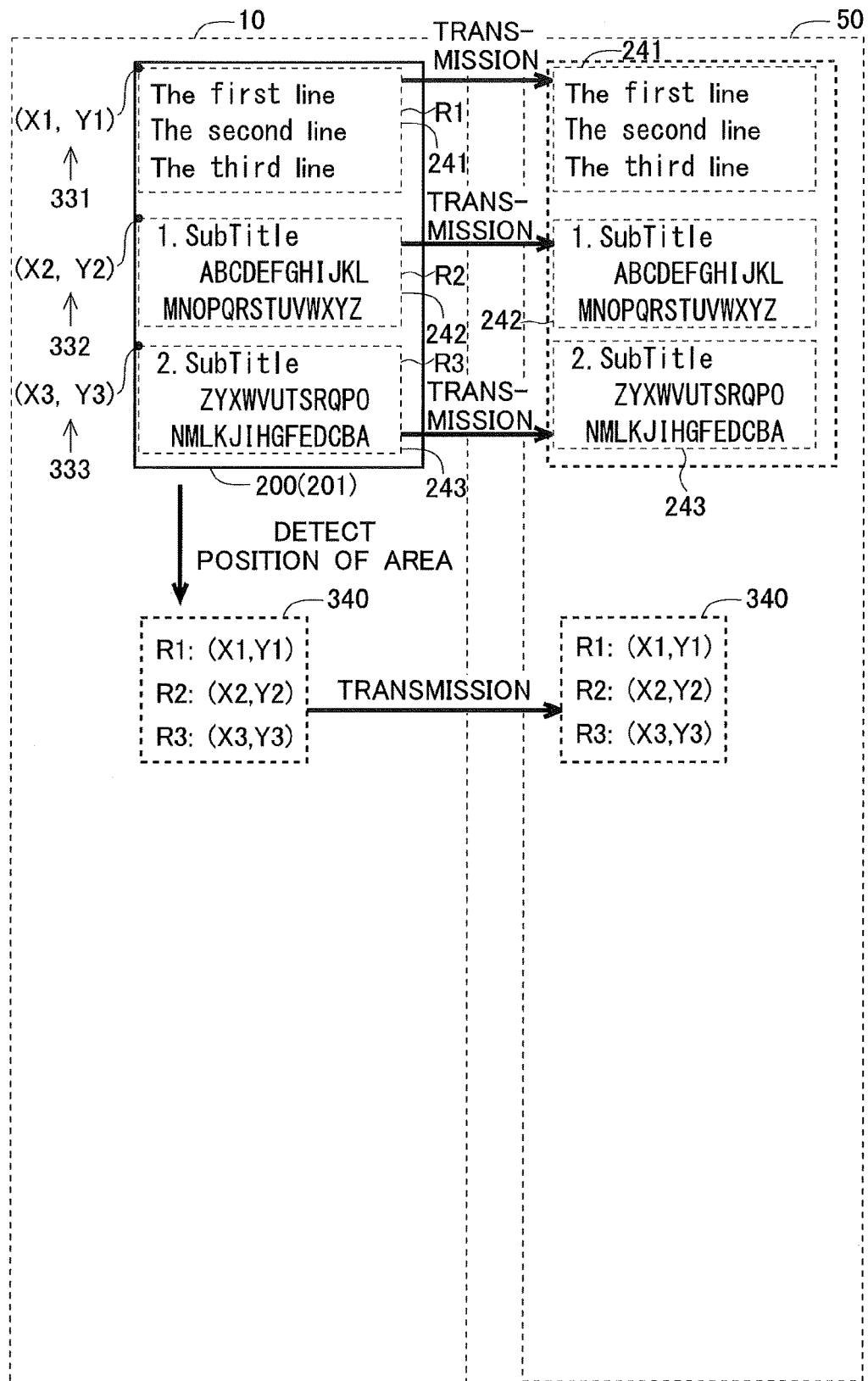
FIG. 13 illustrates an overview of operations according to a fourth embodiment.
Figure 14:
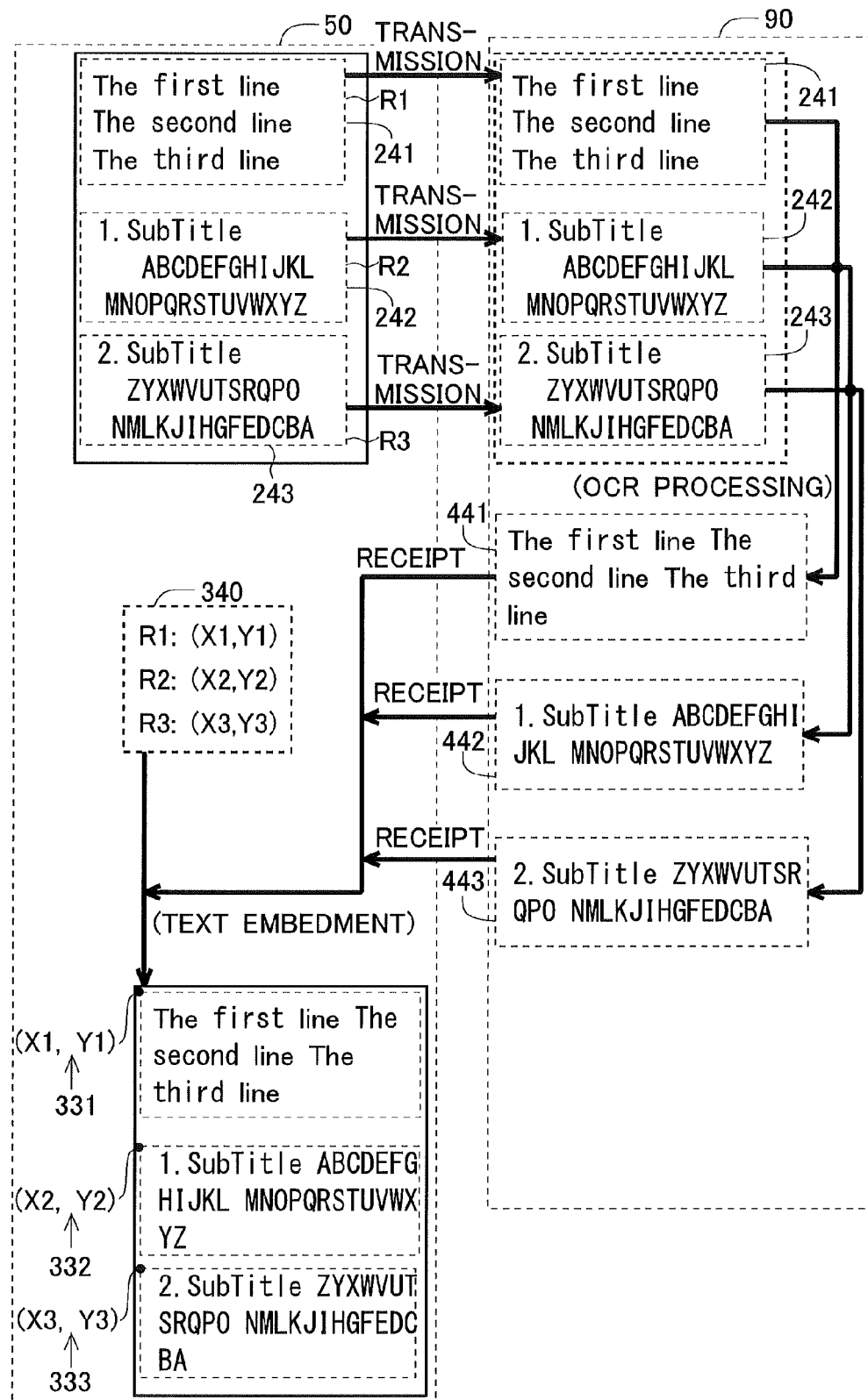
FIG. 14 illustrates an overview of operations according to the fourth embodiment.
Figure 15:
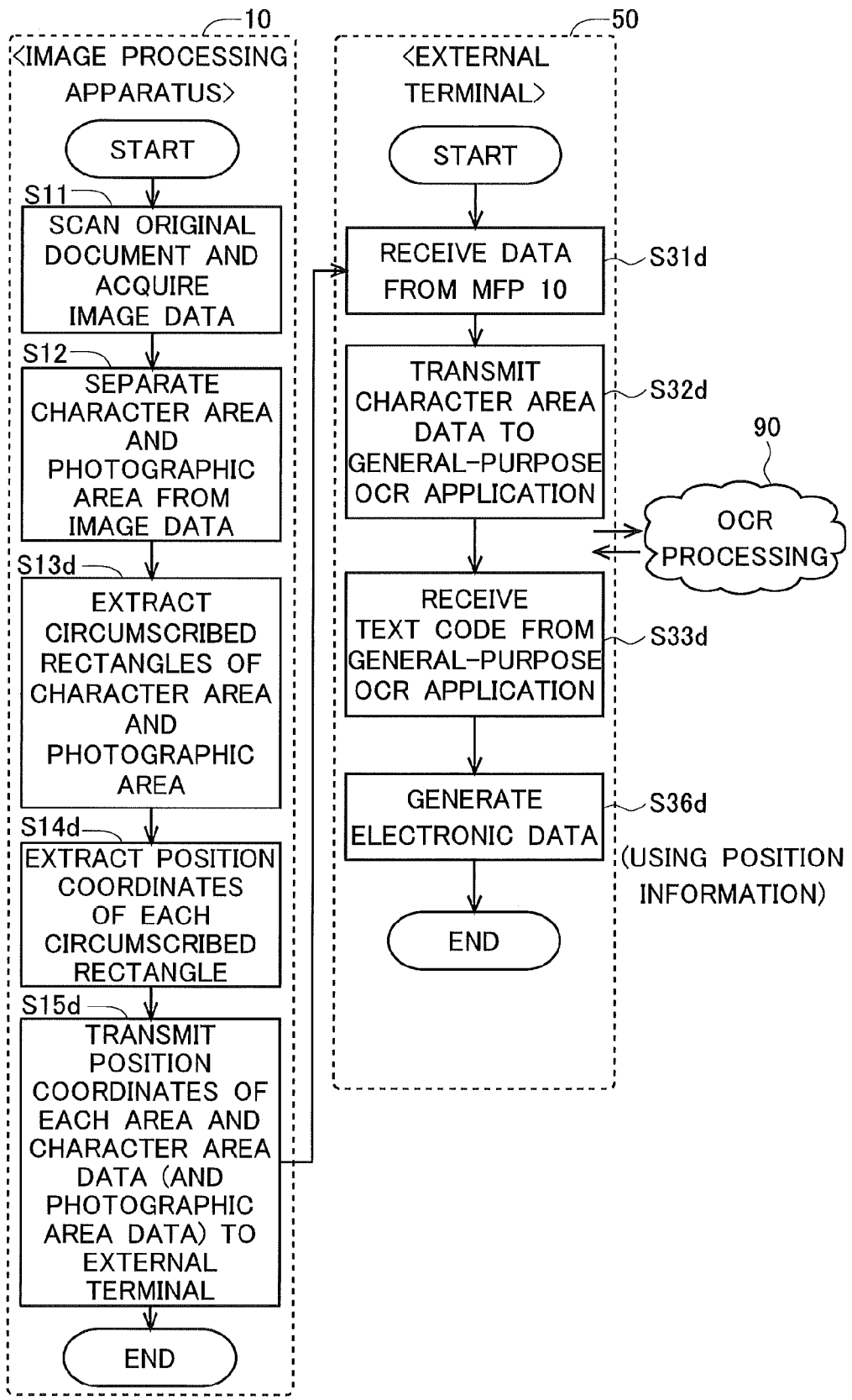
FIG. 15 is a flowchart of the operations according to the fourth embodiment.

Below is a detailed description of such operations with reference to FIGS. 13 to 15. FIGS. 13, 14, and 15 illustrate operations according to the fourth embodiment and correspond respectively to FIGS. 7, 8, and 9 of the second embodiment.

First, as illustrated in FIG. 15, the MFP 10 performs the processing of steps S11 and S12 in the same manner as in the second embodiment.

In the next step S13d, appropriate image processing is performed on the scanned image 201 to extract a plurality of character areas (and a photographic area) in the scanned image 201. More specifically, a circumscribed rectangular area (rectangular area) is extracted for each area (e.g., each character area).

In step S14d, the position of each such area (e.g., a representative position such as a point at the upper-left corner of each circumscribed rectangular area) is identified.

Such processing is performed for each of the plurality of areas in the scanned image 201, so that the position (coordinate position (X, Y)) of each area in the electronic document 500 (specifically, each page of the electronic document) is detected.

Then, the MFP 10 generates data 340 that includes position information (coordinate position (X, Y)) about each area, as the auxiliary data 300. For example, the auxiliary data 340 in FIG. 13 includes information indicating the coordinate position (X1, Y1) of a first character area 241 (R1), the coordinate position (X2, Y2) of a second character area 242 (R2), and a coordinate position (X3,Y3) of a third character area 243 (R3).

In step S15d, the MFP 10 transmits not only the scanned image 201 (specifically, (individual) image data of the areas 241, 242, and 243) but also the auxiliary data 340 to the external terminal 50.

Thereafter, the external terminal 50 performs processing from step S31d onward. Steps S31d, S32d, and S33d respectively perform the same processing as steps S31c, S32c, and S33c described in the third embodiment. The cloud server 90 also performs the same processing as in the third embodiment and transmits the text data 400 (420) as a result of OCR processing (result of optical character recognition processing performed on the scanned image 201) to the external terminal 50. Note that the image data of each of the character areas 241, 242, and 243 is processed individually. To be more specific, the image data of each of the character areas 241, 242, and 243 is individually transmitted from the external terminal 50 to the cloud server 90, and the processing results (text data 441, text data 442, and text data 443) obtained for the image data of the character areas 241, 242, and 243 are individually transmitted from the cloud server 90 to the external terminal 50 (see the middle section of FIG. 14).

In step S36d, the external terminal 50 arranges the character string included in each text data 441, 442, or 443 received in the step S33d, within the electronic document 500 (FIG. 14). At this time, the character string of the OCR processing result for each image data of each character area is arranged at a corresponding position based on the coordinate position described in the auxiliary data 340. Note that the text data 420 is embedded in the electronic document 500 without being displayed.

Consequently, for example as illustrated in FIG. 14, the character string included in the processing result (text data 441) for the character area 241 is arranged at a corresponding position based on the coordinate position (X1, Y1) described in the auxiliary data 340. Similarly, the character strings included in the processing results (text data 442 and text data 443) for the character areas 242 and 243 are arranged at corresponding positions that are respectively based on the coordinate positions (X2, Y2) and (X3, Y3) described in the auxiliary data 340. Note that when the scanned image includes a non-character area (e.g., a photographic area), the image of this non-character area is also arranged within the electronic document 500.

In this way, the electronic document (searchable PDF document) 500 is generated.

As described above, in the fourth embodiment, the external terminal 50 (e.g., the document generation unit 69) complements the processing results 441, 442, and 443 received from the cloud server 90 with the auxiliary data 340 to generate the electronic document 500. The external terminal 50 that uses not only the processing results 441, 424, and 443 received from the cloud server 90 but also the auxiliary data 340 received from the MFP 10 can thus generate the electronic document 500 in which the character strings of the processing results are embedded at appropriate positions (their original positions (positions in the page)).

Through such operations, the external terminal 50 that uses the auxiliary data 340 when generating an electronic document on the basis of the scanned image received from the image forming apparatus 10 in cooperation with another external cooperative device 90 can generate an excellent electronic document. In particular, it is possible to determine the original positions of the areas 241, 242, and 243 more appropriately and to thereby generate a more excellent electronic document. To be more specific, it is possible to generate a searchable PDF document (electronic document 500) in which the character strings of the individual OCR processing results for the areas 241, 242, and 243 in the scanned image 200 are arranged at appropriate positions in the corresponding areas of the scanned image 200.

5. Fifth Embodiment

A fifth embodiment is a variation of the fourth embodiment. The following description focuses on differences from the fourth embodiment.

The above fourth embodiment describes an embodiment in which the auxiliary data 340 indicating position information about a plurality of areas in a scanned image is used to adjust the positions of these areas.

The fifth embodiment describes an embodiment in which auxiliary data 350 (described later) that indicates language information about a plurality of areas in a scanned image is used to designate a processing language to be used in OCR processing performed on the plurality of areas.

Figure 16:
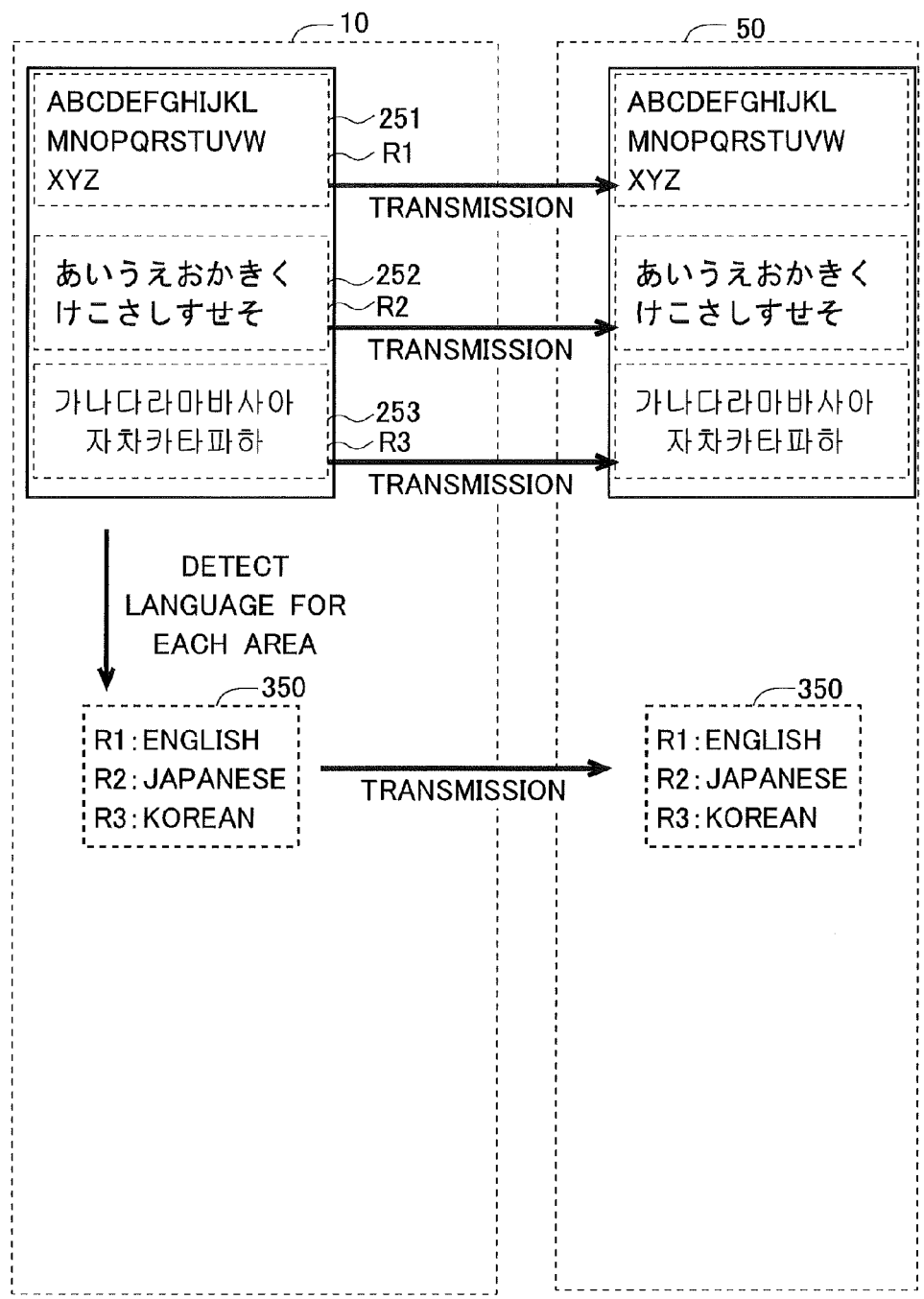
FIG. 16 illustrates an overview of operations according to a fifth embodiment.
Figure 17:
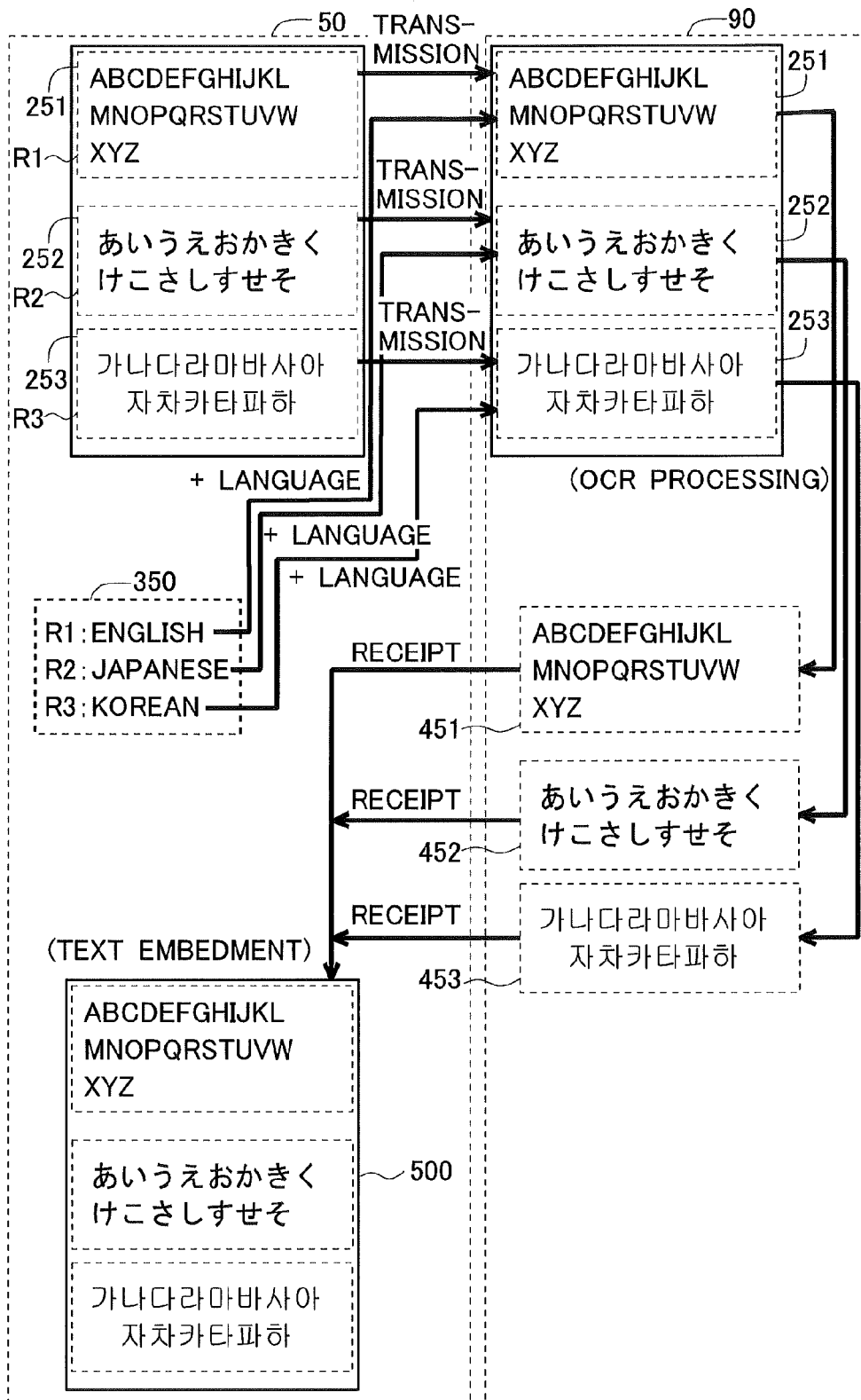
FIG. 17 illustrates an overview of operations according to the fifth embodiment.
Figure 18:
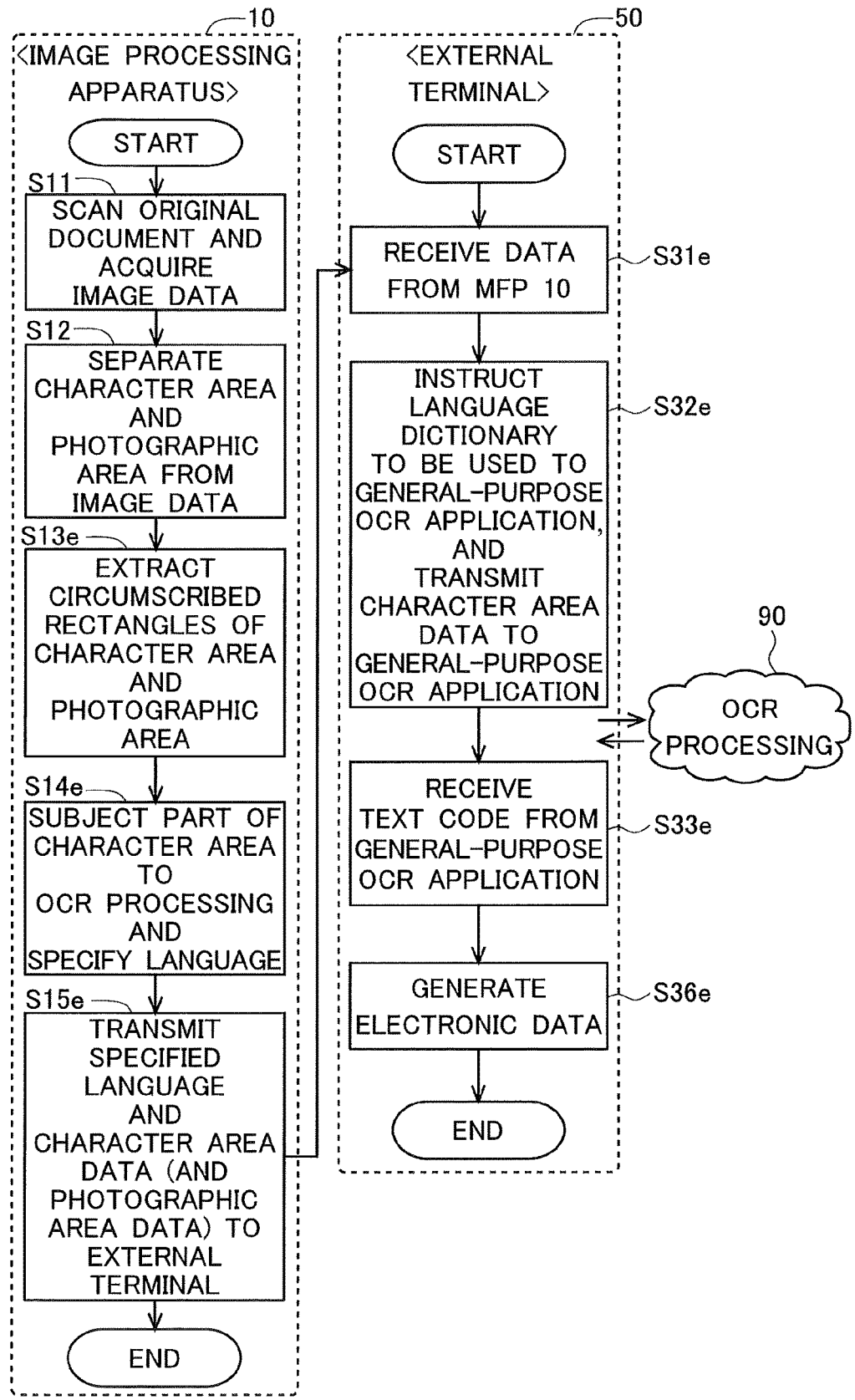
FIG. 18 is a flowchart of the operations according to the fifth embodiment.

Below is a detailed description of such operations with reference to FIGS. 16 to 18. FIGS. 16, 17, and 18 illustrate operations according to the fifth embodiment and correspond respectively to FIGS. 7, 8, and 9 of the second embodiment.

First, as illustrated in FIG. 18, steps S11 to S13 perform the same processing as in the fourth embodiment.

In the next step S14e (FIG. 18), the "language" for each of a plurality of character areas 251, 252, and 253 in the scanned image 201 (205) is specified. In other words, it is determined which of a plurality of languages including English, Japanese, Korean, Chinese, German, and French is used to describe each character area. More specifically, the MFP 10 tentatively performs OCR processing using each of a plurality of languages on the beginning part of each character area, and calculates and gives an index of reliability ("reliability index") of the OCR processing result for each language. Then, the "language" for each character area is determined on the basis of the reliability indices given to the languages used for the character area.

The reliability index is calculated based on the degree of matching between a character image subjected to character recognition processing and a character pattern that most fits to the character image. If the degree of matching is relatively high, a relatively high reliability index is given to the processing result for the character image. On the other hand, if the degree of matching is relatively low, a relatively low reliability index is given to the processing result for the character image. In addition, an average value of the reliability indices for several characters in the character area is calculated as a reliability index (evaluation value) of the result of OCR processing performed using that language on the character area. This processing for calculating the reliability indices is performed for each of a plurality of languages. Then, a language that corresponds to the OCR processing result having the highest reliability index, among the plurality of languages, is determined as the "language" (language type) for the character area.

This processing is performed for each of a plurality of character areas in the scanned image 205 to detect a language for the character area in the electronic document 500 (specifically, each page of the electronic document).

Then, the MFP 10 generates data 350 that includes language information about each character area, as the auxiliary data 300. For example, the auxiliary data 350 in FIG. 16 includes information indicating that the language for the first character area 251 (R1) is "English," the language for the second character area 252 (R2) is "Japanese," and the language for the third character area 253 (R3) is "Korean." In other words, the auxiliary data 350 includes language data that indicates the "language" of characters in each character area of the scanned image.

In step S15e, the MFP 10 transmits not only the scanned image 205 (specifically, (individual) image data of the areas 251, 252, and 253) but also the auxiliary data 350 to the external terminal 50.

Thereafter, the external terminal 50 performs processing from step S31e onward. Steps S31e, S32e, and S33e respectively perform the same processing as steps S31d, S32d, and S33d of the fourth embodiment. The cloud server 90 also performs the same processing as in the fourth embodiment and transmits the text data 400 as a result of OCR processing (result of optical character recognition processing performed on the scanned image 205) to the external terminal 50. Note that image data of each of the character areas 251, 252, and 253 is processed individually. To be more specific, the image data of each of the character areas 251, 252, and 253 is individually transmitted from the external terminal 50 to the cloud server 90 (see the upper section of FIG. 17), and the processing results (text data 451, text data 452, and text data 453) for the image data of the character areas 251, 252, and 253 are individually transmitted from the cloud server 90 to the external terminal 50 (see the middle section of FIG. 17).

More specifically, in step S32e, the external terminal 50 transmits the image data of each of the character areas 251, 252, and 253 to the cloud server 90 while specifying a language dictionary to be used in the OCR processing performed on the character area 251, 252, or 253. In other words, the external terminal 50 transmits the image data of each of the character areas 251, 252, and 253, along with an instruction including designation of a language. This instruction involves designating the language indicated by the auxiliary data 350 as a processing language to be used in the OCR processing. In this way, the external terminal 50 transmits, to the cloud server 90, an instruction to perform optical character recognition for each of a plurality of character areas, using the language detected for the character area.

In step S36e, the external terminal 50 arranges the character strings included in the processing results (text data 451, text data 452, and text data 453) received in step S33e within the electronic document 500 (see also FIG. 17). To be more specific, the OCR processing results obtained for the character areas 251, 252, and 253 are arranged at positions of the character areas 251, 252, and 253 in the electronic document 500. Note that the position of each area (e.g., each character area) may be detected (specified) by the external terminal 50 performing processing such as image processing on the scanned image 200. Alternatively, the MFP 10 may detect (specify) the positions of the plurality of areas as in the fourth embodiment. When the scanned image includes a non-character area (e.g., a photographic area), the image of the non-character area is also arranged in a similar manner within the electronic document 500.

In this way, the electronic document (searchable PDF document) 500 is generated.

As described above, in the fifth embodiment, the external terminal 50 (e.g., the document generation unit 69) receives the auxiliary data 350 from the MFP 10 and uses the auxiliary data 350 to generate the electronic document 500 based on the image data regarding the scanned image 200 in cooperation with the external cooperative device 90. Note that the auxiliary data 350 of the fifth embodiment is used at the time of issuing a processing request to the cloud server 90, unlike the auxiliary data of the first to fourth embodiments (also referred to as data for reproducing a document configuration) that is used after receipt of the processing result from the cloud server 90 (i.e., used to complement the processing result). The auxiliary data 300 of each embodiment is, however, common in that this data is used to generate the electronic document 500.

Through such operations of the fifth embodiment, the external terminal 50 that uses the auxiliary data 350 when generating an electronic document on the basis of the scanned image received from the image forming apparatus 10 in cooperation with another external cooperative device 90 can generate an excellent electronic document. In particular, the external terminal 50 specifies the original language for each character area in advance and designates the language for the OCR processing, before transmitting an OCR processing request (processing execution instruction) to the cloud server 90. This avoids or reduces the possibility that the OCR processing uses a different language other than the original language, thus making it possible to generate an excellent electronic document.

While the above fifth embodiment describes a case in which a plurality of character areas are subjected to translation processing in individual languages, the present invention is not limited to this example. For example, the above-described idea is also applicable to a case in which at least one character area in a page is subjected to OCR processing using one specific language.

While the above fifth embodiment describes an example in which only OCR processing is performed as cooperative processing, the present invention is not limited to this example. For example, the idea of the present invention is also applicable to a case in which a plurality of processes including OCR processing and translation processing are performed as cooperative processing.

Figure 19:
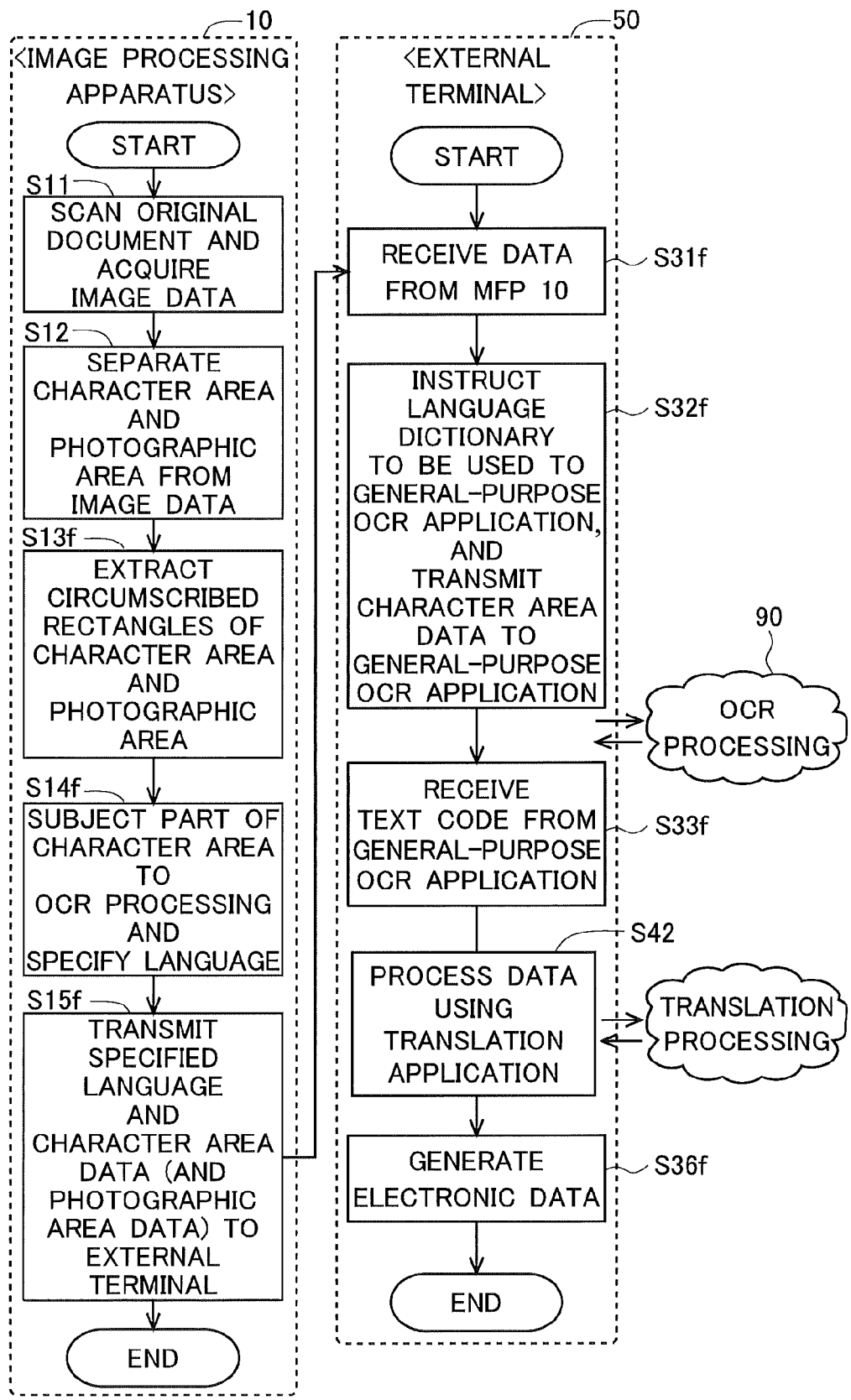
FIG. 19 is a flowchart of operations according to a variation.

FIG. 19 is a flowchart illustrating operations according to such a variation.

Steps S11 to S15 and steps S31 to S33 perform the same processing as in the fifth embodiment.

For example, the external terminal 50 transmits a request to perform OCR processing to the cloud server 90 in step S32 (S320, and the cloud server 90 transmits the result of the OCR processing to the external terminal 50 in step S33 (S33f). Through this, the external terminal 50 acquires the OCR processing result (text data) using a specific language for each character area.

In the next step S42, the external terminal 50 transmits another request to perform translation processing to the cloud server 90. More specifically, the external terminal 50 transmits a request (translation request) to perform translation processing on the OCR processing result (text data) received in step S33f, along with the OCR processing result, to the cloud server 90. At this time, the external terminal 50 designates the OCR processing language described in the auxiliary data 350 (FIG. 17) as a translation source language, before requesting the cloud server 90 to do translation from the translation source language to a translation target language. Assume here that the translation target language is fixed to a specific language (e.g., Japanese or German). Such a translation request may be transmitted for each of a plurality of character areas in the scanned image 200.

Referring to the area 251 (see FIG. 17), for example, "English" is specified as the translation source language, and a request for translation into a predetermined translation target language is transmitted. For the area 252, "Japanese" is specified as the translation source language, and a request for translation into a predetermined target language is transmitted. For the area 253, "Korean" is specified as the translation source language, and a request for translation into a predetermined target language is transmitted. If the translation source language and the translation target language are the same language, it is possible to omit the transmission of a translation request to the cloud server 90.

The external terminal 50 then receives a translation result (text data) from the cloud server 90. To be more specific, the external terminal 50 receives the translation result for each of a plurality of character areas in the scanned image 200.

In the subsequent step S36f, the external terminal 50 arranges the character strings included in the processing results received in step S42 within the electronic document 500.

In this way, the electronic document (searchable PDF document) 500 is generated.

Through the above-described operations, the external terminal 50 that uses the auxiliary data 350 when generating an electronic document on the basis of the scanned image received from the image forming apparatus 10 in cooperation with another external cooperative device 90 can generate an excellent electronic document. In particular, the external terminal 50 specifies the original language for each character area as an OCR processing language in advance before transmitting an OCR processing request to the cloud server 90, and also specifies the original language for the character area as a translation source language in advance before transmitting a translation request to the cloud server 90. This avoids or reduces the possibility that the translation processing uses a different language other than the original language as the translation source language, thus making it possible to generate a more excellent electronic document.

While in the present example, individual instructions to individually perform a plurality of processes, including the OCR processing and the translation processing, are transmitted (at different times) from the external terminal 50 to the cloud server 90, the present invention is not limited to this example. Instead of such individual instructions to perform a plurality of processes including OCR processing and translation processing, a single instruction to collectively perform a plurality of processes, for example, may be transmitted (at a certain point in time) from the external terminal 50 to the cloud server 90.

6. Variations

While the above has been a description of embodiments of the present invention, the present invention is not intended to be limited to the examples described above.

For example, the above description gives an embodiment in which the idea of the third embodiment is implemented independently of the ideas of the first and second embodiments.

The present invention is, however, not limited to this example, and a configuration is also possible in which the idea of the above-described third embodiment is implemented in combination with the idea(s) of other (another) embodiment(s) (e.g., first and second embodiments). For example, the first embodiment (or the second embodiment) may be such that the auxiliary data 300 is generated to include the font size for each line, and the font size for each line of the character string of the processing result received from the cloud server 90 is set to the "font size for each line" received from the MFP 10 to generate an electronic document.

The same applies to the idea of the above-described fourth embodiment. For example, the idea of the fourth embodiment may be implemented in combination with the first and/or third embodiment.

Figure 20:
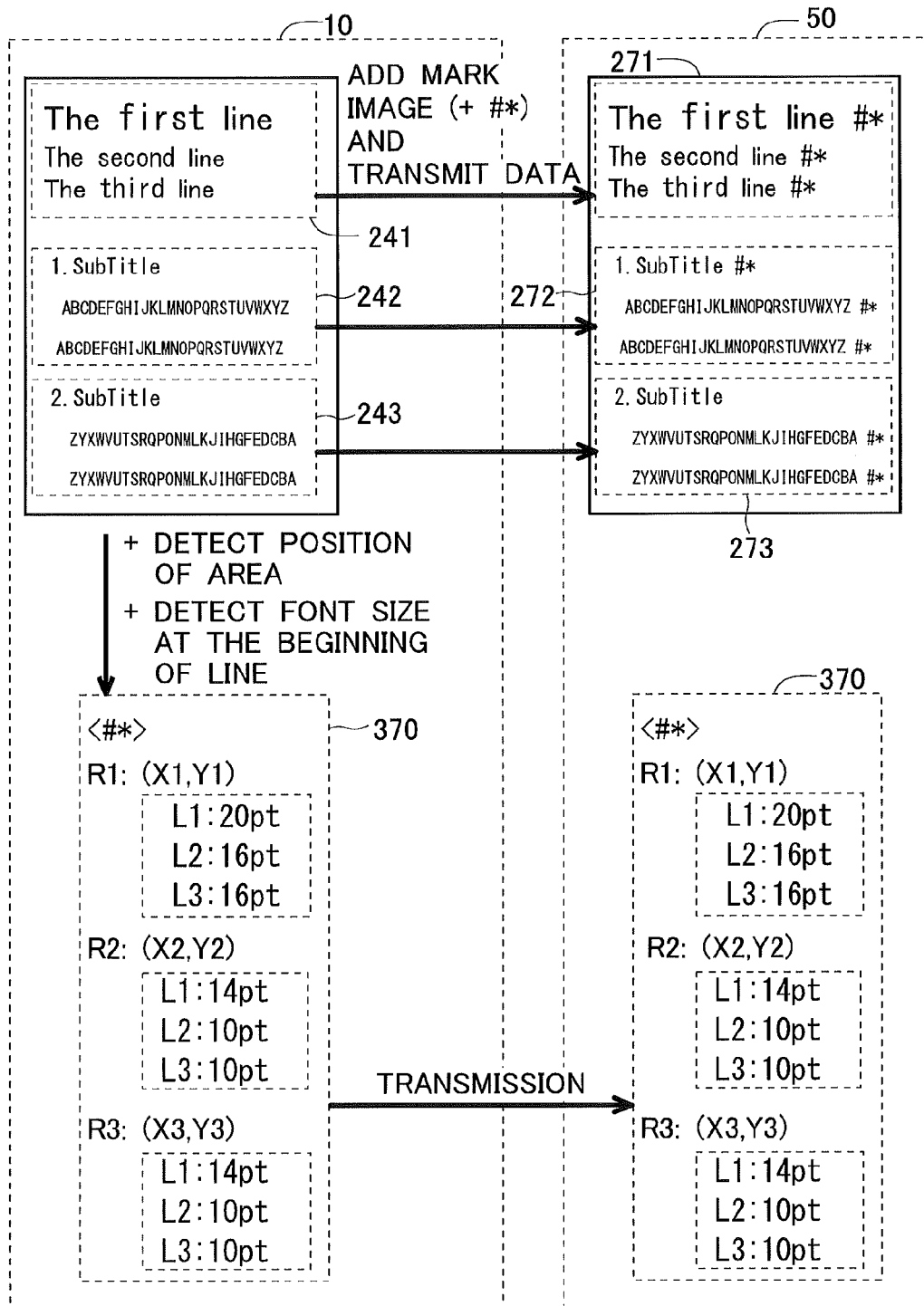
FIG. 20 illustrates an overview of operations according to another variation.
Figure 21:
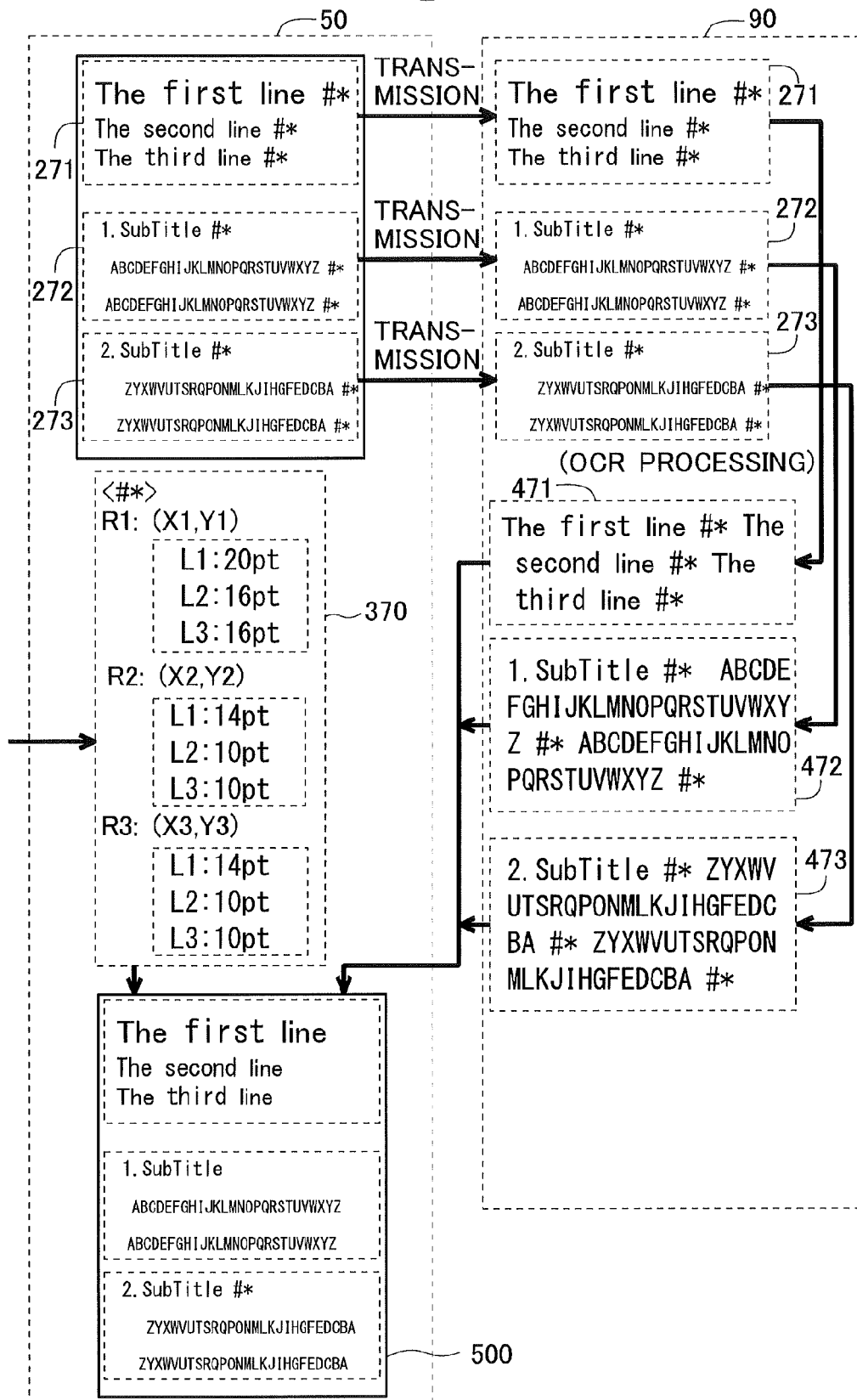
FIG. 21 illustrates an overview of the operations according to the variation in FIG. 20.

FIGS. 20 and 21 illustrate a variation that achieves the idea of a combination of the first, third, and fourth embodiments. FIG. 20 corresponds to FIG. 4 of the first embodiment, and FIG. 21 corresponds to FIG. 5 of the first embodiment.

In this variation, the MFP 10 generates information indicating the positions (coordinate positions (X, Y)) of the three character areas 241, 242, and 243, as in the fourth embodiment. The generated information is included in auxiliary data 300 (370). Various types of processing according to the first and third embodiments may be performed appropriately for each character area. For example, the processing for determining the font size as in the third embodiment may be performed for each "line" of each character area. In this case, the auxiliary data 370 includes information about the font size for each line in each character area. Similarly, the processing for specifying line-end positions as in the first embodiment may be performed for each line in each character area. In this case, the auxiliary data 370 includes information about a line-end identifying character string ("#*") for each line in each character area. Note that the mark-added scanned images 271, 272, and 273 for the character areas 241, 242, and 243 in FIG. 20 can also be expressed as constituting part of the auxiliary data 370.

Then, the external terminal 50 transmits a request to perform OCR processing regarding the scanned image 200 and other data to the cloud server 90, and the cloud server 90 the result of the OCR processing performed on the scanned image 200 to the external terminal 50. To be more specific, the external terminal 50 transmits requests to perform OCR processing regarding the mark-added scanned images 271, 272, and 273 and other data to the cloud server 90, and the cloud server 90 transmits the results of the OCR processing performed on the mark-added scanned images 271, 272, and 273 to the external terminal 50.

Thereafter, the external terminal 50 can perform processing for complementing the OCR processing results received from the cloud server 90 with pieces of information included in the auxiliary data 370.

More specifically, the external terminal 50 arranges the character strings included in the OCR processing results (text data) 471, 472, and 473 obtained for the three character areas 241, 242, and 243 at appropriate positions within the electronic document 500 on the basis of the information indicating the positions (coordinate positions (X, Y)) of the character areas 241, 242, and 243 (see also FIG. 21).

The external terminal 50 also specifies the end of each line on the basis of the existential positions of the line-end identifying character strings "#*" included in the OCR processing results (text data) 471, 472, and 473 obtained for the mark-added scanned images 271, 272, and 273. Then, the OCR processing results are divided into a plurality of lines for arrangement.

The external terminal 50 also arranges the character strings of the processing results having appropriate font sizes (appropriate sizes) on the basis of the information about the font size for each line in each character area (information included in the auxiliary data 370).

Through such operations, the electronic document 500 as illustrated in the lower left of FIG. 21 is generated.

The idea of the fourth embodiment can also be achieved in combination with the second and/or third embodiment(s).

Figure 22:
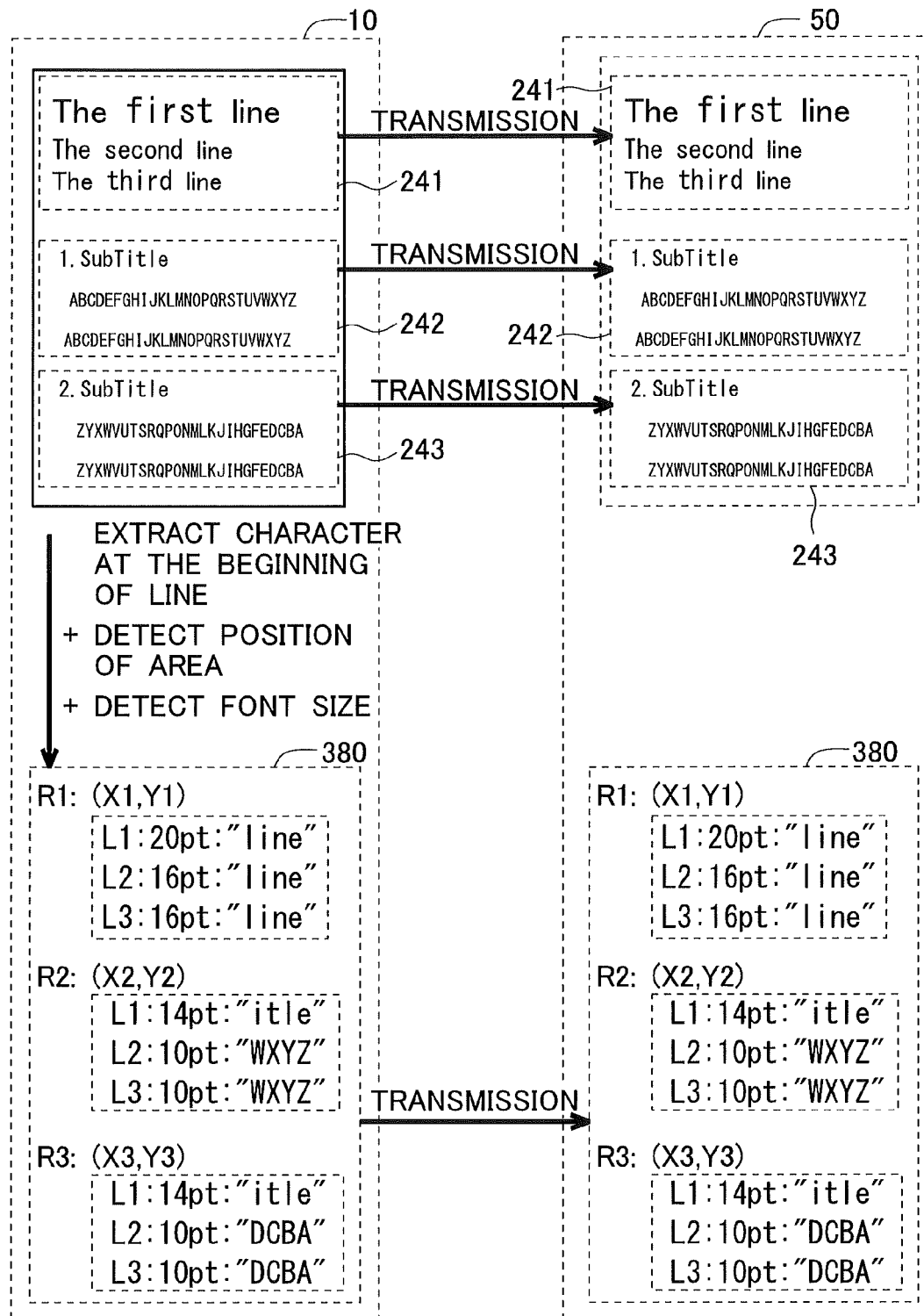
FIG. 22 illustrates an overview of operations according to yet another variation.
Figure 23:
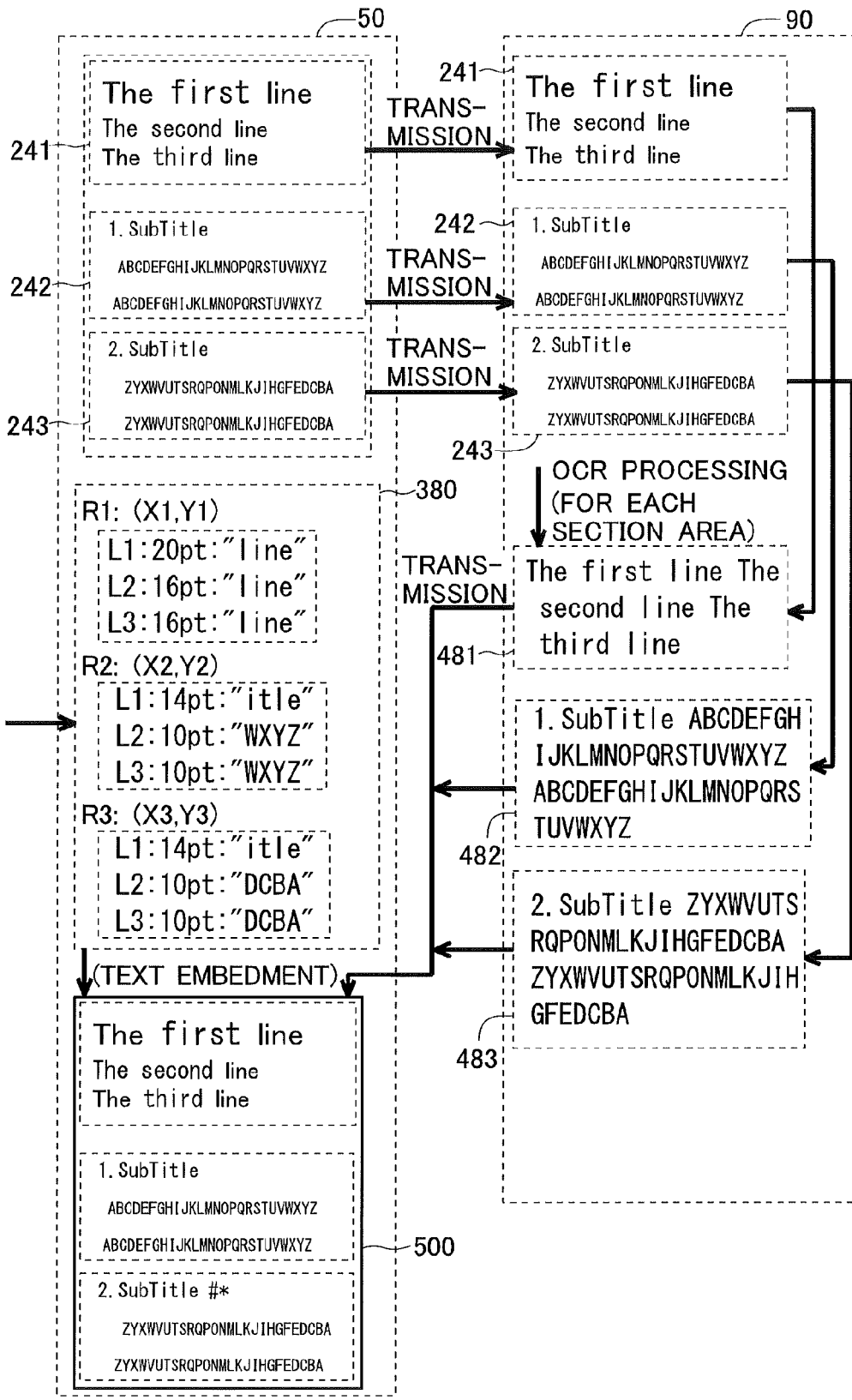
FIG. 23 illustrates an overview of the operations according to the variation in FIG. 22.

FIGS. 22 and 23 illustrate a variation that achieves the idea of a combination of the second, third, and fourth embodiments. FIG. 22 corresponds to FIG. 7 of the second embodiment, and FIG. 23 corresponds to FIG. 8 of the second embodiment.

In this variation, the MFP 10 generates information indicating the positions of the three character areas 241, 242, and 243, as in the fourth embodiment. The generated information is included in auxiliary data 300 (380). Various types of processing according the third and second embodiments may be performed appropriately for each character area. For example, the processing for specifying line-end positions (e.g., processing for detecting line-end character strings) as in the second embodiment may be performed for each line in each character area. In this case, the auxiliary data 380 includes information about a line-end character string for each line in character area.

Thereafter, the external terminal 50 can perform processing for complementing the OCR processing results received from the cloud server 90 with pieces of information included in the auxiliary data 380.

More specifically, the external terminal 50 arranges the character strings included in the OCR processing results (text data) 481, 482, and 83 obtained for the three character areas 241, 242, and 243 at appropriate positions in the electronic document 500 on the basis of the information indicating the positions (coordinate positions (X, Y)) of the character areas 241, 242, and 243 (see also FIG. 23).

The external terminal 50 also specifies the end of each line on the basis of information about the line-end character string for each line in each character area. Then, the OCR processing result for each character area is divided into a plurality of lines for arrangement.

The external terminal 50 that arranges the character strings of the processing results also uses an appropriate font size (appropriate size) for each line on the basis of information about the font size for each line in each character area.

Through such operations, the electronic document 500 as illustrated in the lower left of FIG. 23 is generated.

The same also applies to the idea of the above-described fifth embodiment. The idea of the fifth embodiment may also be achieved in combination of other (another) embodiment(s) (e.g., fourth embodiment).

In the electronic document 500 (searchable PDF document) finally generated in the above-described embodiments, the original scanned image 201 is displayed (arranged while being displayed), and the processing result (text data) received from the cloud server 90 is arranged without being displayed. The present invention is, however, not limited to this example. For example, the processing result (text data) received from the cloud server 90 may be visualized and arranged (displayed) (at corresponding positions) in the electronic document 500. In this case, the original scanned image 201 may be hidden in the electronic document 500.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An electronic document generation system comprising:
   an image forming apparatus configured to generate a scanned image of an original document; and
   an external terminal configured to generate an electronic document on the basis of image data regarding the scanned image received from the image forming apparatus, the electronic document including the image data and a predetermined processing result of the image data,
   the image forming apparatus including:
   an auxiliary data generation unit configured to generate auxiliary data that is used in processing for generating the electronic document and that is used to specify a break of each line of a character string in the scanned image; and
   a communication unit configured to transmit the auxiliary data to the external terminal, and
   the external terminal including:
   a reception unit configured to receive the auxiliary data from the image forming apparatus; and
   a document generation unit configured to specify the break of each line on the basis of the auxiliary data to generate the electronic document on the basis of the image data regarding the scanned image in cooperation with an external cooperative device that is a different device from the external terminal.

2. The electronic document generation system according to claim 1, wherein
   the external terminal further includes a transmission unit configured to transmit the image data regarding the scanned image and an instruction to perform optical character recognition processing regarding the scanned image, to the external cooperative device,
   the reception unit receives a processing result of the optical character recognition processing regarding the scanned image from the external cooperative device, and
   the document generation unit complements the processing result with the auxiliary data to generate the electronic document.

3. The electronic document generation system according to claim 2, wherein
   the auxiliary data generation unit of the image forming apparatus detects a line-end position at which each line of a character string ends in the scanned image, generates image data of a mark-added scanned image by adding a mark image to the line-end position of each line in the scanned image, the mark image being obtained by imaging a line-end identifying character string for identifying the line-end position of each line, and generates the line-end identifying character string as the auxiliary data,
   the communication unit of the image forming apparatus transmits the image data of the mark-added scanned image as the image data regarding the scanned image to the external terminal,
   the reception unit of the external terminal receives a processing result of the optical character recognition processing performed on the mark-added scanned image from the external cooperative device as the processing result of the optical character recognition processing regarding the scanned image, and
   the document generation unit of the external terminal generates the electronic document by specifying an original line-end position in a character string of the processing result on the basis of the processing result and the line-end identifying character string and dividing the character string of the processing result into a plurality of lines.

4. The electronic document generation system according to claim 2, wherein
   the auxiliary data generation unit of the image forming apparatus detects a line-end character string in each line of the character string in the scanned image and generates the line-end character string in each line as the auxiliary data, and
   the document generation unit of the external terminal generates the electronic document by specifying an original line-end position in a character string of the processing result on the basis of the processing result and the line-end character string in the line and dividing the character string of the processing result into a plurality of lines.

5. The electronic document generation system according to claim 2, wherein the auxiliary data generation unit of the image forming apparatus detects a font size of characters in each line of the character string in the scanned image and generates the font size for each line as the auxiliary data, and the document generation unit of the external terminal generates the electronic document by setting a font size for each line of a character string of the processing result to the font size received for the line as the auxiliary data from the image forming apparatus.

6. The electronic document generation system according to claim 2, wherein the auxiliary data generation unit of the image forming apparatus detects positions of a plurality of character areas in the scanned image and generates the positions of the plurality of character areas as the auxiliary data, the transmission unit of the external terminal transmits respective image data of each of the plurality of character areas in the scanned image and an instruction to perform optical character recognition processing regarding the respective image data, to the external cooperative device, the reception unit of the external terminal receives a processing result of the optical character recognition processing regarding the respective image data from the external cooperative device, and the document generation unit of the external terminal generates the electronic document by arranging a character string of the processing result for the respective image data, received from the external cooperative device, at a corresponding one of the positions of the plurality of character areas on the basis of the processing result received for the respective image data and the positions of the plurality of character areas received as the auxiliary data from the image forming apparatus.

7. The electronic document generation system according to claim 1, wherein the auxiliary data generation unit of the image forming apparatus detects a line-end position of each line of the character string in the scanned image, and generates image data of a mark-added scanned image as the auxiliary data by adding a mark image to the line-end position for the line in the scanned image, the mark image being obtained by imaging a line-end identifying character string for identifying the line-end position for each line, the external terminal further includes a transmission unit configured to transmit the image data of the mark-added scanned image and an instruction to perform optical character recognition processing regarding the image data of the mark-added scanned image to the external cooperative device, the reception unit of the external terminal receives a processing result of the optical character recognition processing performed on the mark-added scanned image from the external cooperative device, and the document generation unit generates the electronic document by specifying an original line-end position in a character string of the processing result on the basis of the processing result and the line-end identifying character string and dividing the character string of the processing result into a plurality of lines.

8. The electronic document generation system according to claim 1, wherein the external terminal further includes a transmission unit configured to transmit the image data regarding the scanned image and an instruction to perform at least one cooperative processing including optical character recognition processing regarding the scanned image, to the external cooperative device, the auxiliary data includes language data that indicates a language of characters in the scanned image, the instruction involves designating the language indicated by the language data as a processing language to be used in the optical character recognition processing, the reception unit receives a processing result of the at least one cooperative processing from the external cooperative device, and the document generation unit generates the electronic document on the basis of the processing result of the at least one cooperative processing.

9. The electronic document generation system according to claim 8, wherein the auxiliary data generation unit of the image forming apparatus detects a language for each of a plurality of character areas in the scanned image and generates the languages for the plurality of character areas as the auxiliary data, the transmission unit of the external terminal transmits an instruction to perform optical character recognition processing using the language detected for each of the plurality of character areas on each of the plurality of character areas, to the external cooperative device, the reception unit of the external terminal receives processing results of the optical character recognition processing performed respectively on the plurality of character areas from the external cooperative device, and the document generation unit of the external terminal generates the electronic document on the basis of the processing results for the plurality of character areas, received from the external cooperative device.

10. The electronic document generation system according to claim 9, wherein the at least one cooperative processing includes the optical character recognition processing regarding the scanned image, and translation processing for translating a character string of a processing result of the optical character recognition processing into a predetermined language, the transmission unit of the external terminal transmits an instruction to perform optical character recognition processing and translation processing for each of the plurality of character areas, to the external cooperative device, the optical character recognition processing using the language detected for each of the plurality of character areas, and the translation processing being translation from the language into a predetermined language, the reception unit of the external terminal receives processing results of the translation processing performed on the plurality of character areas from the external cooperative device, and the document generation unit of the external terminal generates the electronic document on the basis of the processing results of the translation processing for the plurality of character areas, received from the external cooperative device.

11. The electronic document generation system according to claim 4, wherein the auxiliary data generation unit of the image forming apparatus performs the processing for detecting the line-end character string for each line in parallel with the optical character recognition processing performed by the external cooperative device.

12. The electronic document generation system according to claim 5, wherein
the auxiliary data generation unit of the image forming apparatus performs the processing for detecting a font size of characters in each line in parallel with the optical character recognition processing performed by the external cooperative device.

13. The electronic document generation system according to claim 1, wherein
the auxiliary data is data for specifying an end of each line in a character string in a character area of the scanned image.

14. A non-transitory computer-readable recording medium that records a program for causing a computer that is built into an external terminal and configured to generate an electronic document on the basis of image data regarding a scanned image received from an image forming apparatus, the electronic document including the image data and a predetermined processing result of the image data, the non-transitory computer-readable recording medium being configured to cause the computer to execute the steps of:
a) receiving auxiliary data to be used in processing for generating the electronic document, from the image forming apparatus and to be used to specify a break of each line of a character string in the scanned image; and
b) using the auxiliary data to specify the break of each line on the basis of the auxiliary data to generate the electronic document on the basis of the image data regarding the scanned image in cooperation with an external cooperative device that is a different device from the external terminal.

15. The non-transitory computer-readable recording medium according to claim 14, wherein
the step b) includes the steps of:
b-1) transmitting the image data regarding the scanned image and an instruction to perform optical character recognition processing regarding the scanned image, to the external cooperative device;
b-2) receiving a processing result of the optical character recognition processing regarding the scanned image from the external cooperative device; and
b-3) complementing the processing result with the auxiliary data to generate the electronic document.

16. The non-transitory computer-readable recording medium according to claim 15, wherein
the step a) includes the step of:
a-1) receiving a line-end identifying character string as the auxiliary data from the image forming apparatus, the step a-1) being performed before the step b-3),
the step b) further includes the step of:
b-4) receiving image data of a mark-added scanned image as the image data regarding the scanned image from the image forming apparatus, the step b-4) being performed before the step b-1), the mark-added scanned image being obtained by adding a mark image to a line-end position for each line of the character string in the scanned image, the mark image being obtained by imaging the line-end identifying character string,
in the step b-1), the image data of the mark-added scanned image is transmitted as the image data regarding the scanned image to the external cooperative device,
in the step b-2), a processing result of the optical character recognition processing performed on the mark-added scanned image is received as the processing result of the optical character recognition processing regarding the scanned image, and
in the step b-3), the electronic document is generated by specifying an original line-end position in a character string of the processing result on the basis of the processing result and the line-end identifying character string, and dividing the character string of the processing result into a plurality of lines.

17. The non-transitory computer-readable recording medium according to claim 15, wherein
the step a) includes the step of:
a-1) receiving a line-end character string for each line of the character string in the scanned image as the auxiliary data from the image forming apparatus, the step a-1) being performed before the step b-3), and
in the step b-3), the electronic document is generated by specifying an original line-end position in a character string of the processing result on the basis of the processing result and the line-end character string of the line, and dividing the character string of the processing result into a plurality of lines.

18. The non-transitory computer-readable recording medium according to claim 15, wherein
the step a) includes the step of:
a-1) receiving a font size of characters in each line of the character string in the scanned image as the auxiliary data from the image forming apparatus, the step a-1) being performed before the step b-3), and
in the step b-3), the electronic document is generated by setting the font size for each line of a character string of the processing result to the font size received for the line as the auxiliary data from the image forming apparatus.

19. The non-transitory computer-readable recording medium according to claim 15, wherein
the step a) includes the step of:
a-1) receiving positions of a plurality of character areas in the scanned image as the auxiliary data from the image forming apparatus, the step a-1) being performed before the step b-3),
in the step b-1), an instruction to perform optical character recognition processing regarding respective image data of each of the plurality of character areas included in the scanned image is transmitted to the external cooperative device,
in the step b-2), a processing result of the optical character recognition processing regarding the respective image data is received from the external cooperative device, and
in the step b-3), the electronic document is generated by arranging a character string of the processing result for the respective image data, received from the external cooperative device, at a corresponding one of the positions of the plurality of character areas on the basis of the processing result received for the respective image data and the positions of the plurality of character areas received from the image forming apparatus.

20. The non-transitory computer-readable recording medium according to claim 14, wherein
the step a) includes the step of:
a-1) receiving image data of a mark-added scanned image as the auxiliary data, the mark-added scanned image being obtained by adding a mark image to a line-end position for each line of the character string in the scanned image, the mark image being obtained by imaging a line-end identifying character string for identifying a line-end position, and the step b) includes the steps of:

b-1) transmitting image data of the mark-added scanned image and an instruction to perform optical character recognition processing regarding the image data of the mark-added scanned image, to the external cooperative device;

b-2) receiving a processing result of the optical character recognition processing performed on the mark-added scanned image from the external cooperative device; and b-3) generating an electronic document by specifying an original line-end position in a character string of the processing result on the basis of the processing result and the line-end identifying character string and dividing the character string of the processing result into a plurality of lines.

21. The non-transitory computer-readable recording medium according to claim 14, wherein in the step a), language data that indicates a language of characters in the scanned image is received as the auxiliary data, the step b) further includes the steps of:

b-1) transmitting the image data regarding the scanned image and an instruction to perform at least one cooperative processing including optical character recognition processing regarding the scanned image, to the external cooperative device;

b-2) receiving a processing result of the at least one cooperative processing from the external cooperative device; and b-3) generating the electronic document on the basis of the processing result, and the instruction in the step b-1) involves designating the language indicated by the language data as a processing language to be used in the optical character recognition processing.

22. The non-transitory computer-readable recording medium according to claim 14, wherein the auxiliary data is data for specifying an end of each line in a character string in a character area of the scanned image.

* * * * *